United States Patent
Susitaival et al.

(10) Patent No.: US 11,212,717 B2
(45) Date of Patent: Dec. 28, 2021

(54) SPLIT SIGNALLING RADIO BEARER IN HANDOVER

(71) Applicant: TELEFONAKTIEBOLAGET LM ERICSSON (PUBL), Stockholm (SE)

(72) Inventors: Riikka Susitaival, Helsinki (FI); Oumer Teyeb, Solna (SE); Gunnar Mildh, Sollentuna (SE); Osman Nuri Can Yilmaz, Espoo (FI); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 16/620,456

(22) PCT Filed: May 4, 2018

(86) PCT No.: PCT/IB2018/053125
§ 371 (c)(1),
(2) Date: Dec. 6, 2019

(87) PCT Pub. No.: WO2018/203300
PCT Pub. Date: Nov. 8, 2018

(65) Prior Publication Data
US 2020/0187064 A1    Jun. 11, 2020

Related U.S. Application Data

(60) Provisional application No. 62/502,433, filed on May 5, 2017.

(51) Int. Cl.
*H04W 36/00* (2009.01)
*H04W 36/08* (2009.01)

(52) U.S. Cl.
CPC ....... *H04W 36/0069* (2018.08); *H04W 36/08* (2013.01)

(58) Field of Classification Search
CPC . H04W 36/0069; H04W 36/08; H04W 76/27; H04W 36/0033; H04W 36/0055
See application file for complete search history.

(56) References Cited

U.S. PATENT DOCUMENTS

2013/0089022 A1   4/2013   Lu et al.
2016/0135103 A1*  5/2016   Lee ............... H04W 72/0406
                                              455/444

(Continued)

FOREIGN PATENT DOCUMENTS

WO       2016056075 A1    4/2016

OTHER PUBLICATIONS

Ericsson, Introduction of option 3—Dual Connectivity with NR in E-UTRAN—RAN3 parts, R3-171152, 3GPP TSG-RAN WG3 Meeting #95bis, Spokane, WA, USA, Apr. 3-7, 2017.

*Primary Examiner* — Allahyar Kasraian

(57) ABSTRACT

According to certain embodiments, a method by a first network node operating as a secondary node for a wireless device having dual connectivity to the first network node and a second network node operating as a source master node is performed during a handover of the wireless device from the second network node operating as the master node to a third network node operating as a target master node. The method includes receiving, from the second network node operating as the source master node, an indication that the first network node is to release one or more resources for serving user plane data to the wireless device. In response to the indication, control plane data is transmitted to the wireless device while ceasing to provide user plane data to the wireless device.

16 Claims, 19 Drawing Sheets

(56) References Cited

U.S. PATENT DOCUMENTS

| | | | | |
|---|---|---|---|---|
| 2016/0337924 A1* | 11/2016 | Ohta | ......................... | H04L 5/00 |
| 2017/0034866 A1* | 2/2017 | Wager | ................... | H04W 76/27 |
| 2017/0188278 A1* | 6/2017 | Ohta | .................... | H04W 36/04 |
| 2017/0318505 A1* | 11/2017 | Park | ................. | H04W 36/0058 |
| 2018/0199240 A1* | 7/2018 | Dao | ...................... | H04L 67/148 |
| 2019/0014471 A1* | 1/2019 | Saily | .................... | H04L 9/0891 |
| 2020/0229264 A1* | 7/2020 | Bangolae | ................ | H04W 4/70 |

* cited by examiner

SPLIT SIGNALLING RADIO BEARER IN HANDOVER

This application is a 371 of International Application No. PCT/IB2018/053125, filed May 4, 2018, which claims the benefit of U.S. Application No. 62/502,433, filed May 5, 2017, the disclosures of which are fully incorporated herein by reference.

TECHNICAL FIELD

The present disclosure relates, in general, to wireless communications and, more particularly, systems and methods for split signalling radio bearer (SRB) in handover.

BACKGROUND

RAN has agreed to introduce split signalling radio bearer (SRB) for E-UTRA-NR Dual Connectivity (DC) to provide robustness for important signalling such as, for example, handover commands and measurement reports. According to the E-UTRA-NR DC operation, a multiple Receiver/Transmitter (RX/TX) user equipment (UE) in RRC CONNECTED is configured to utilize radio resources provided by two distinct schedulers located in two eNodeBs (eNBs) or other radio base stations connected via a non-ideal backhaul over the X2 interface (see 3GPP 36.300). "Non-ideal backhaul" implies that the transport of messages over the X2 interface between the nodes may be subject to both packet delays and losses.

eNBs involved in DC for a certain UE may assume two different roles: an eNB may either act as a Master node (MN), also referred to as Master eNB (MeNB), or as a Secondary node (SN), also referred to as Secondary eNB (SeNB). In DC, a UE is connected to one MN and one SN.

In LTE DC, the radio protocol architecture that a particular bearer uses depends on how the bearer is setup. Three bearer types exist: Master Cell Group (MSG) bearer, Secondary Cell Group (SCG) bearer, and split bearers. Radio Resource Control (RRC) is located in MN and Signalling Radio Bearers (SRBs) are always configured as MSG bearer type and therefore only use the radio resources of the MN. When a node acts as an SN, LTE DC does not have any UE RRC context of that UE and all such signalling is handled by the MN. Thus, in the known LTE DC, signalling messages, such as RRC messages are provided via one link such as RRC messages.

FIG. 1 illustrates an example LTE DC User Plane (UP).

In 3GPP, a study item on a new radio interface for 5G has recently been completed and 3GPP has now continued with the effort to standardize this new radio interface, often abbreviated by NR (New Radio). Within the context of this document, the terms 5G and NR are used interchangeably. It may be apparent from the context if the term refers specifically to the NR radio interface, or if the terms refer to the broader 5G architectural concepts described within this disclosure. This is because the techniques described in herein are not only limited to solution that operate with the NR or LTE technologies. The techniques are generally applicable to any solution for detecting, managing and recovering from problems occurring when signaling messages may be duplicated, lost or severely delayed, particularly in a dual-connectivity situation, wherein signaling messages can be transferred through multiple links served by multiple infrastructure nodes.

LTE-NR (New Radio) DC (also referred to as LTE-NR tight interworking or E-UTRA-NR Dual Connectivity) is currently being discussed for rel-15. The SN in this case is also referred to as SgNB (secondary gNB, where gNB denotes the NR base station).

In this context, the major changes from LTE DC are
- The introduction of split data radio bearer from the SN (known as SCG split bearer).
- The introduction of split bearer for RRC
- The introduction of a direct RRC from the SN FIGS. 2, 3 and 4 show the UP and Control Plane (CP) architectures for LTE-NR tight interworking. Specifically, FIG. 2 illustrates an example LTE-NR tight interworking UP. FIG. 3 illustrates an example split bearer for control plane in 5G. FIG. 4 illustrates an example LTE-NR dual connectivity CP.

It may be appreciated that the embodiments disclosed herein apply to different scenarios where the MN and SN nodes can apply various radio interface technologies. The MN node may apply, for example, LTE or NR, and the SN node may also use either LTE or NR without departing from the main concepts discussed herein. Other technologies may also be used over the radio interface. The 3GPP technical report TR 38.304 includes various scenarios and combinations where the MN and SN are applying either NR, LTE, or both.

For the first phase of 5G standardization and 5G deployment, the most likely scenario is that MN will apply LTE, and the SN will apply the new radio interface, NR, currently being under standardization.

As already mentioned above, the DC approach introduced for 5G standardization includes a solution for split bearers for SRBs, as shown in FIGS. 3 and 4. The intent of introducing such "RRC diversity" is to enable, for example, better mobility robustness and improved message delivery between the infrastructure and the UE. For example, it is then possible to send a handover message or any other reconfiguration message over the best link, even if one of either the link or links to the MN (or SN) has deteriorated significantly. It is also possible to send duplicates of the same message over both MS and SN to achieve a better success-rate and faster delivery of the concerned message, in case the links are error prone. Such benefits of "RRC diversity" are not available in the current LTE DC solution, and 3GPP has therefore undertaken the challenge to enable such RRC diversity. Having RRC diversity may prove particularly important for ultra-reliable connections with low latency, often called URLLC.

Current agreements in 3GPP include that "split SRBs" solutions shall be available for both SRB1 and SRB2. For example, SRB1 is likely to be used for transmission of reconfiguration messages, handover messages, and for transferring of core-network signaling messages between the UE and the infrastructure. SRB2 may be used for example for measurement reports, and potentially for some non-critical messages with a different priority compared to the messages on SRB1. It should be noted that the embodiments may be applied to both uplink and downlink split SRBs. FIG. 4 includes a schematic illustration of three SRBs. The leftmost is only transmitted over MN, and the rightmost is only transmitted over SN. The middle ones (SRB1 and SRB2) will be focused on herein, wherein messages can be transmitted both over MN and SN.

FIG. 4 illustrates a scenario where MN is operating with LTE, and SN is operating with NR. As can be seen, RRC messages generated/transmitted from the MN can be sent either via the MN or relayed over an X2 interface to the SN node that here uses the NR technology. The messages received over the different paths in the UE are then combined to the LTE RRC receiving entity and processed further. In the uplink, the UE generates LTE RRC messages that it may transmit either over the NR radio interface towards the SN node or via the MN node using LTE technology. Messages received in the SN node are then forwarded over an X2 interface towards the MN node.

For handover with DC, the following scenarios may be considered:
- Inter-MeNB handover to the new MeNB while SCG is released
- Inter-MeNB handover to the new MeNB which is same as old SCG
- Inter-MeNB handover to the new MeNB while old SCG is kept In Release 12, RAN2/RAN3 agreed to release MeNB when there is an inter-MeNB handover. Later, in Release 13, an enhancement was introduced in RAN3 allowing to keep the SCG while there is MeNB handover.

The main reason behind handover command duplication/diversity is to enable the network to send RRC messages over two paths, MCG and SCG. To enable this, SRB1 needs to be configured as split SRB. This way, the UE is prepared to receive RRC signaling over two paths and it can be left to network implementation which path to select for the DL message (one or two).

FIG. 5 illustrates an example RRC procedure for the case when the SCG is released during inter-MeNB Handover. As depicted in FIG. 5, the steps are as follows:

1. It is assumed that Dual Connectivity and split SRB1 are configured for the UE.
2. Network decides to trigger handover towards the Target MeNB (T-MeNB).
3. The handover command (RRCConnectionReconfiguration with mobilityControlInfo) is sent towards the UE over the MeNB and the SeNB.
4. The UE receives the first version of the handover (HO) command. When receiving handover command, the UE triggers handover towards T-MeNB.
5. The duplicate of the handover command comes later. If the UE is no longer connected to the node transmitting the second handover command, the UE may not receive it. If the UE does receive the duplicate, then the duplicate is discarded in the PDCP layer. See more in R2-1704423, Handling of split SRBs in LTE PDCP for LTE-NR interworking.

FIG. 6 illustrates the Release 12 procedure discussed in TS 36.300. Specifically, FIG. 6 demonstrates an example signaling flow for the MeNB to eNB Change procedure when SeNB is released during MeNB handover. The signaling flow includes Uu and X2 signaling as follows:

1. The source MeNB starts the MeNB to eNB Change procedure by initiating the X2 Handover Preparation procedure. The source MeNB includes the SCG configuration in the HandoverPreparationInformation.
2. The target eNB includes the field in HO command which releases SCG configuration and may also provide forwarding addresses to the source MeNB. The addition of an SeNB can be initiated only after completing HO.
3. If the allocation of target eNB resources was successful, the MeNB initiates the release of the source SeNB resources towards the source SeNB. If data forwarding is needed, the MeNB provides data forwarding addresses to the source SeNB. Either direct data forwarding or indirect data forwarding is used for SCG bearer. Only indirect data forwarding is used for Split bearer. Reception of the SeNB Release Request message triggers the source SeNB to stop providing user data to the UE and, if applicable, to start data forwarding. However, when SRB duplications or split is used, the SeNB needs to serve the UE for the PDCP data even after this message.
4. The MeNB triggers the UE to apply the new configuration. Upon receiving the new configuration, the UE releases the entire SCG configuration.
5/6. The UE synchronizes to the target eNB.
7/8. If applicable, data forwarding from the source SeNB takes place. It may start as early as the source SeNB receives the SeNB Release Request message from the MeNB.
9-13. The target eNB initiates the S1 Path Switch procedure.
14. The target eNB initiates the UE Context Release procedure towards the source MeNB. The SeNB can release the UE context when receiving the UE Context Release message at 14.
15. Upon reception of the UE CONTEXT RELEASE message, the S-SeNB can release radio and C-plane related resource associated to the UE context. Any ongoing data forwarding may continue.

In some scenarios, the SeNB may be kept during MeNB-handover with SRB diversity. FIG. 7 illustrates an example inter-MeNB handover without SeNB change. The example signalling flow for inter-MeNB handover without SeNB change follows:

1. The source MeNB starts the handover procedure by initiating the X2 Handover Preparation procedure. The source MeNB includes the SCG configuration in the HandoverPreparationInformation. The source MeNB includes the SeNB UE X2AP ID and SeNB ID as a reference to the UE context in the SeNB that was established by the source MeNB in the Handover Request message.
2. If the target MeNB decides to keep the SeNB, the target MeNB sends SeNB Addition Request to the SeNB including the SeNB UE X2AP ID as a reference to the UE context in the SeNB that was established by the source MeNB.
3. The SeNB replies with SeNB Addition Request Acknowledge.
4. The target MeNB includes within the Handover Request Acknowledge message a transparent container to be sent to the UE as an RRC message to perform the handover which also includes the SCG configuration and may also provide forwarding addresses to the source MeNB. The target MeNB indicates to the source MeNB that the UE context in the SeNB is kept if the target MeNB and the SeNB decided to keep the UE context in the SeNB in step 2 and step 3.
5. The source MeNB sends SeNB Release Request to the SeNB. The source MeNB indicates to the SeNB that the UE context in SeNB is kept. If the indication as the UE context kept in SeNB is included, the SeNB keeps the UE context.
   This step can be contrasted with FIG. 6 since here the MeNB indicates to the SeNB that the SeNB needs to continue to serve the UE and provide RRC PDUs including the handover command.
6. The source MeNB triggers the UE to apply the new configuration.
7/8. The UE synchronizes to the target MeNB and replies with RRCConnectionReconfigurationComplete message.
9. The UE synchronizes to the SeNB.

10. If the RRC connection reconfiguration procedure was successful, the target MeNB informs the SeNB.

11/12. Data forwarding from the source MeNB takes place. Data forwarding may be omitted for SCG bearers. Direct data forwarding from the source MeNB to the SeNB is not possible for split bearers. Direct data forwarding may occur only for bearer type change.

13-16. The target MeNB initiates the S1 Path Switch procedure. If new UL TEIDs of the S-GW are included, the target MeNB performs MeNB initiated SeNB Modification procedure to provide them to the SeNB.

17. The target MeNB initiates the UE Context Release procedure towards the source MeNB.

18. Upon reception of the UE Context Release message, the SeNB can release C-plane related resource associated to the UE context towards the source MeNB. Any ongoing data forwarding may continue. The SeNB shall not release the UE context associated with the target MeNB if the indication was included in the SeNB Release Request in step 5.

There currently exists certain problem(s). One such problem is the intent to enable "split RRC" (also denoted as "RRC diversity" and "split SRB") to solve handover scenario where the UE has lost to the connection to the MeNB. In certain circumstances, the network may duplicate RRC messages both over MeNB and SeNB. Alternatively, the network may decide to fast switch the leg used for transmission. This is to guarantee that the message can be received via some leg. For example, if the MeNB leg is already bad, the handover command can be delivered via SeNB leg.

However, in this handover scenario, the UE is reconfigured with the configuration received from the target MeNB. PDCP entity may also be reconfigured and security keys may change. This means that RLC/PDCP entities need to be re-established and MAC reset. Because of this, duplicate detection as specified in PDCP layer does not work. In addition, special communication is needed between MeNB, SeNB and target-MeNBs to enable handover assisted with split SRB.

SUMMARY

To address the foregoing problems with existing solutions, disclosed is systems and methods for split signalling radio bearer (SRB) in handover.

According to certain embodiments, a method by a first network node operating as a secondary node for a wireless device having dual connectivity to the first network node and a second network node operating as a source master node is performed during a handover of the wireless device from the second network node operating as the master node to a third network node operating as a target master node. The method includes receiving, from the second network node operating as the source master node, an indication that the first network node is to release one or more resources for serving user plane data to the wireless device. In response to the indication, control plane data is transmitted to the wireless device while ceasing to provide user plane data to the wireless device.

According to certain embodiments, a first network node operates as a secondary node for a wireless device having dual connectivity to the first network node and a second network node operating as a master node during a handover of the wireless device from the source master node to a third network node operating as a target master node. The first network node includes memory storing instructions and processing circuitry operable to execute the instructions to cause the first network node to receive, from the second network node operating as the source master node, an indication that the first network node is to release one or more resources for serving user plane data to the wireless device. In response to the indication, control plane data is transmitted to the wireless device while ceasing to provide user plane data to the wireless device.

According to certain embodiments, a method by a first network node operating as a source master node for a wireless device having dual connectivity to the first network node and a second network node operating as a slave node is performed during a handover from the source master node to a third network node operating as a target master node. The method includes transmitting, to the second network node operating as the secondary node, an indication that the second network node is to release resources for serving user plane data to the wireless device while continuing to transmit control plane data to the wireless device. The method also includes transmitting, to the second network node, the control plane data to be forwarded to the wireless device.

According to certain embodiments, a first network node operates as a source master node for a wireless device having dual connectivity to the first network node and a second network node operating as a slave node during a handover from the source master node to a third network node operating as a target master node. The first network node includes memory storing instructions and processing circuitry operable to execute the instructions to cause the first network node to transmit, to the second network node operating as the secondary node, an indication that the second network node is to release resources for serving user plane data to the wireless device while continuing to transmit control plane data to the wireless device. The first network node also includes transmits, to the second network node, the control plane data to be forwarded to the wireless device.

According to certain embodiments, a method by a wireless device having dual connectivity to a first network node operating as a source master node and a second network node operating as a source secondary node is performed during a handover from the source master node to a third network node operating as a target master node. The method includes receiving, from the first network node operating as the secondary node, a first handover command indicating handover to the third network node operating as the target master node. A timer is started for keeping a configuration associated with the second network node operating as the secondary node. Before of the expiration of the timer, an acknowledgment indicating successful receipt of the first handover command is transmitted to the second network node operating as the secondary node. In response to the first handover command, a handover is initiated to the third network node operating as the target master node. After expiration of the timer, the configuration associated with the second network node is released.

According to certain embodiments, a wireless device has dual connectivity to a first network node operating as a source master node and a second network node operating as a source secondary node during a handover from the source master node to a third network node operating as a target master node. The wireless device includes memory storing instructions and processing circuitry operable to execute the instructions to cause the wireless device to receive, from the first network node operating as the secondary node, a first handover command indicating handover to the third network node operating as the target master node. A timer is started for keeping a configuration associated with the second network node operating as the secondary node. Before of the expiration of the timer, an acknowledgment indicating successful receipt of the first handover command is transmitted to the second network node operating as the secondary node. In response to the first handover command, a handover is initiated to the third network node operating as the target master node. After expiration of the timer, the configuration associated with the second network node is released.

According to certain embodiments, a method by a first network node operating as a secondary node for a wireless device having dual connectivity to the first network node and a second network node operating as a source master node is performed during a handover from the second network node to a third network node operating as a target master node. The method includes receiving, from the second network node operating as the source master node, an indication that the first network node is to continue to transmit control plane data and user data to the wireless device. In response to the indication, radio resource control (RRC) configuration information is transmitted to the second network node for forwarding to the wireless device. At least one of the control plane data and the user plane data is received, and the RRC configuration information is used to transmit the at least one of the control plane data and the user plane data to the wireless device.

According to certain embodiments, a first network node operates as a secondary node for a wireless device having dual connectivity to the first network node and a second network node operating as a source master node. The first network node includes memory storing instructions and processing circuitry operable to execute the instructions to cause the first network node to receive, from the second network node operating as the source master node, an indication that the first network node is to continue to transmit control plane data and user data to the wireless device. In response to the indication, radio resource control (RRC) configuration information is transmitted to the second network node for forwarding to the wireless device. At least one of the control plane data and the user plane data is received, and the RRC configuration information is used to transmit the at least one of the control plane data and the user plane data to the wireless device.

According to certain embodiments, a method by a first network node operating as a source master node for a wireless device having dual connectivity to the first network node and a second network node operating as a secondary node is performed during a handover from the first network node to a third network node operating as a target master node. The method includes transmitting, to the second network node operating as the secondary node, an indication that the second network node is to continue to transmit control plane data and user plane data to the wireless device. Radio resource control (RRC) configuration information is received from the second network node and is forwarded to the wireless device to maintain the second network node as a secondary node for the wireless device. At least one of the control plane data and the user plane data is transmitted to the second network node.

According to certain embodiments, a first network node operates as a source master node for a wireless device having dual connectivity to the first network node and a second network node operating as a secondary node. The first network node includes memory storing instructions and processing circuitry operable to execute the instructions to cause the first network node to transmit, to the second network node operating as the secondary node, an indication that the second network node is to continue to transmit control plane data and user plane data to the wireless device. Radio resource control (RRC) configuration information is received from the second network node and is forwarded to the wireless device to maintain the second network node as a secondary node for the wireless device. At least one of the control plane data and the user plane data is transmitted to the second network node.

According to certain embodiments, a method by a wireless device having dual connectivity to a first network node operating as a source master node and a second network node operating as a source secondary node is performed during a handover from the source master node to a third network node operating as a target master node. The method includes receiving a first handover command indicating handover from the first network node to a third network node operating as a target master node. In response to the first handover command, a handover is initiated to the target master node. A second handover command indicating handover to the target master node is received. Based on new RRC configuration information received from the second network node operating as the source secondary node, the wireless device determines that the second handover command is a duplicate of the first handover command and discards the second handover command.

According to certain embodiments, a wireless device has dual connectivity to a first network node operating as a source master node and a second network node operating as a source secondary node during a handover from the source master node to a third network node operating as a target master node. The wireless device includes memory storing instructions and processing circuitry operable to execute the instructions to cause the wireless device to receive a first handover command indicating handover from the first network node to a third network node operating as a target master node. In response to the first handover command, a handover to the target master node is initiated. A second handover command indicating handover to the target master node is received. Based on new RRC configuration information received from the second network node operating as the source secondary node, the wireless device determines that the second handover command is a duplicate of the first handover command and discards the second handover command.

Certain embodiments of the present disclosure may provide one or more technical advantages. For example, certain embodiments improve mobility robustness, for example, by enabling lossless handover by means of the use of split SRB. Another example, certain embodiments may enable split SRB with the benefits of signalling diversity over multiple links. As still another example, the UE may be provided with a new radio resource control (RRC) configuration and security keys so that the UE is able to receive the handover command from the secondary node where the secondary node will continue to serve the UE. Still another example technical advantage may be that, if the UE receives duplicate handover commands from the master node and the secondary node, the UE knows to disregard the second handover command.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
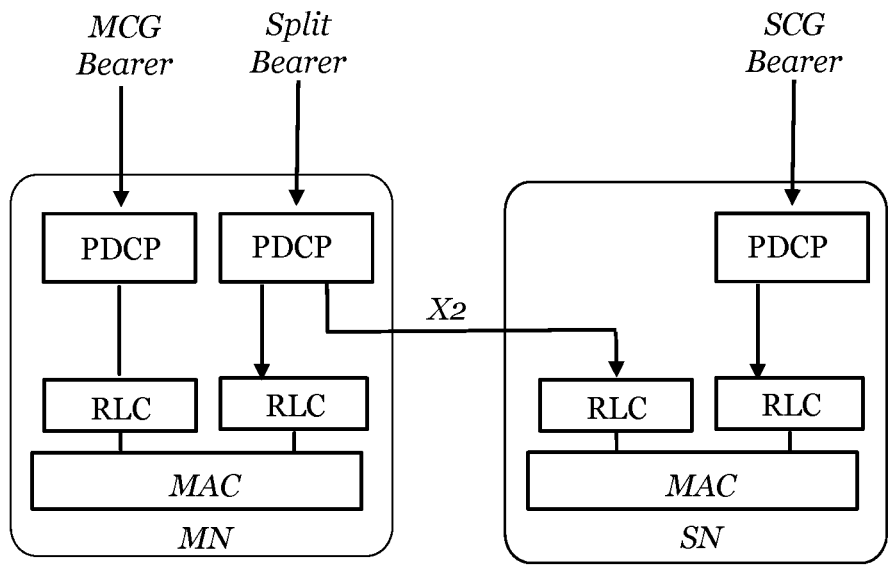
FIG. 1 illustrates an example LTE Dual Connectivity User Plane (UP)
Figure 2:
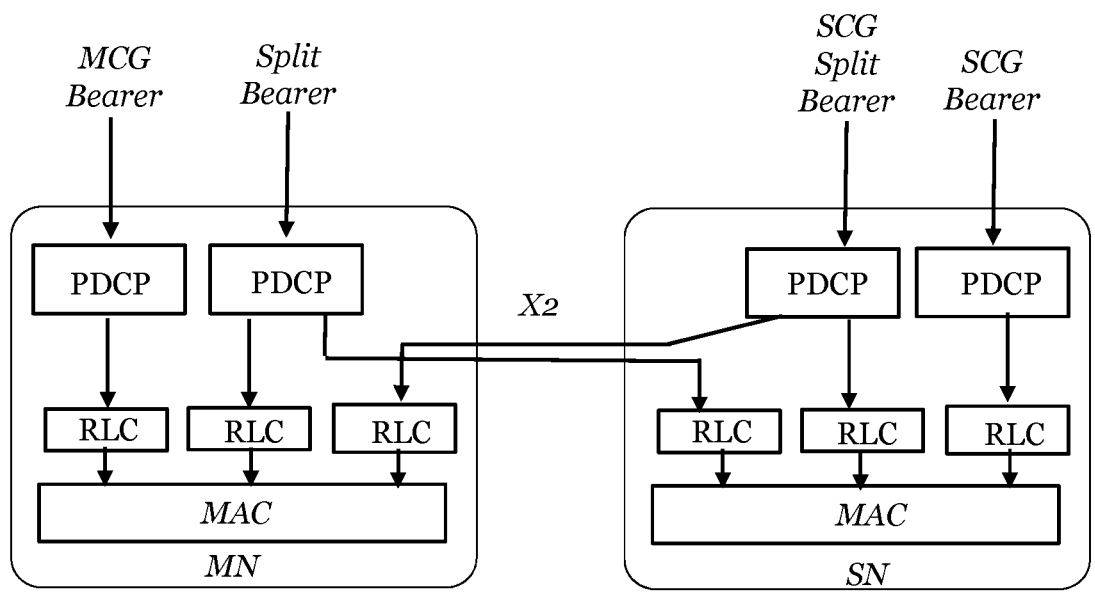
FIG. 2 illustrates an example LTE-NR tight interworking UP.
Figure 3:
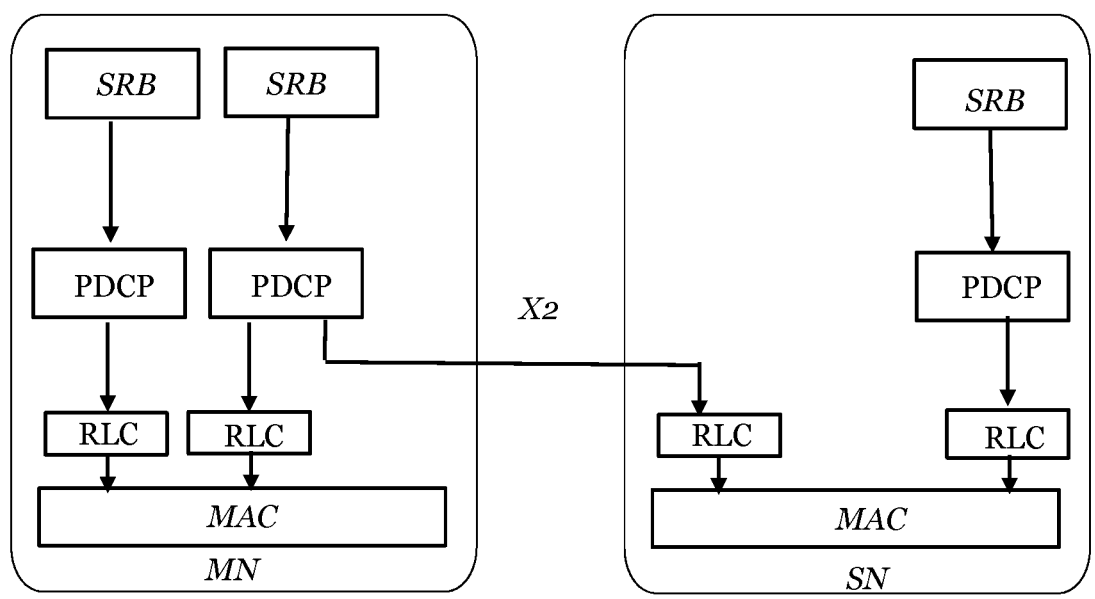
FIG. 3 illustrates an example split bearer for control plane in 5G.
Figure 4:
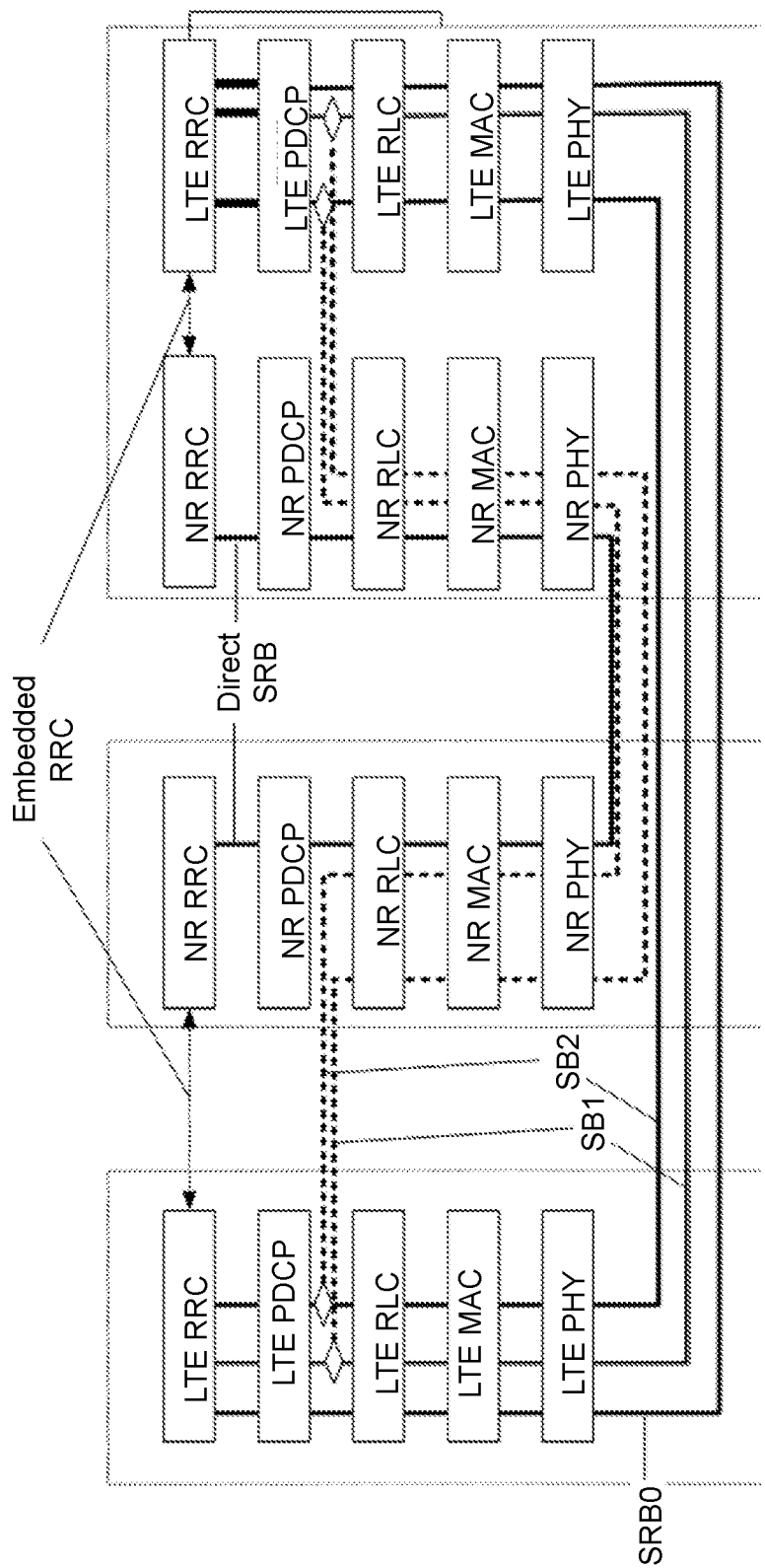
FIG. 4 illustrates an example LTE-NR dual connectivity Control Plane (CP)

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. This disclosure uses the terms master node (MN) and secondary node (SN). It is generally recognized that the techniques disclosed herein may be used for LTE and NR implementations. Thus, the term master node may refer to a master eNodeB (MeNB) in LTE implementations or a master gNodeB in NR implementations. Likewise, the term secondary node may refer to a secondary eNodeB (SeNB) in LTE implementations or a secondary gNodeB (SgNB) in NR implementations. Thus, any implementations and examples described below as being applicable to the MeNB and SeNB are equally applicable to a MgNB and SgNB.

Disclosed herein are various aspects for handover with split signaling radio bearer (SRB). According to certain embodiments, a wireless device, which may include a user equipment (UE) may implement a solution for detecting or discarding duplicate packet data convergence protocol (PDCP) packets even when the PDCP entity has been reconfigured and re-established. In some embodiments, network signaling may be provided when the SeNB is to continue to serve the wireless device. Certain embodiments disclosed herein enable "split SRB" and the benefits of signaling diversity over multiple links by eliminating the severe problems that may occur.

According to certain embodiments, the SeNB may be released during handover. As described above with regard to FIG. 5, an example RRC procedure for a scenario where it is assumed that the wireless device is configured for Dual Connectivity (DC) and split SRB may include the following steps:

The network decides to trigger handover towards a Target MeNB (T-MeNB).

The handover command, which may include for example an RRCConnectionReconfiguration with mobilityControlInfo message, is sent towards the UE over the MeNB and the SeNB.

The UE receives the first version of the handover command. When receiving handover command, the UE triggers Handover towards T-MeNB.

The duplicate of the Handover command comes later. If the UE is no longer connected to the node transmitting the message, the UE may not receive it.

Figure 5:
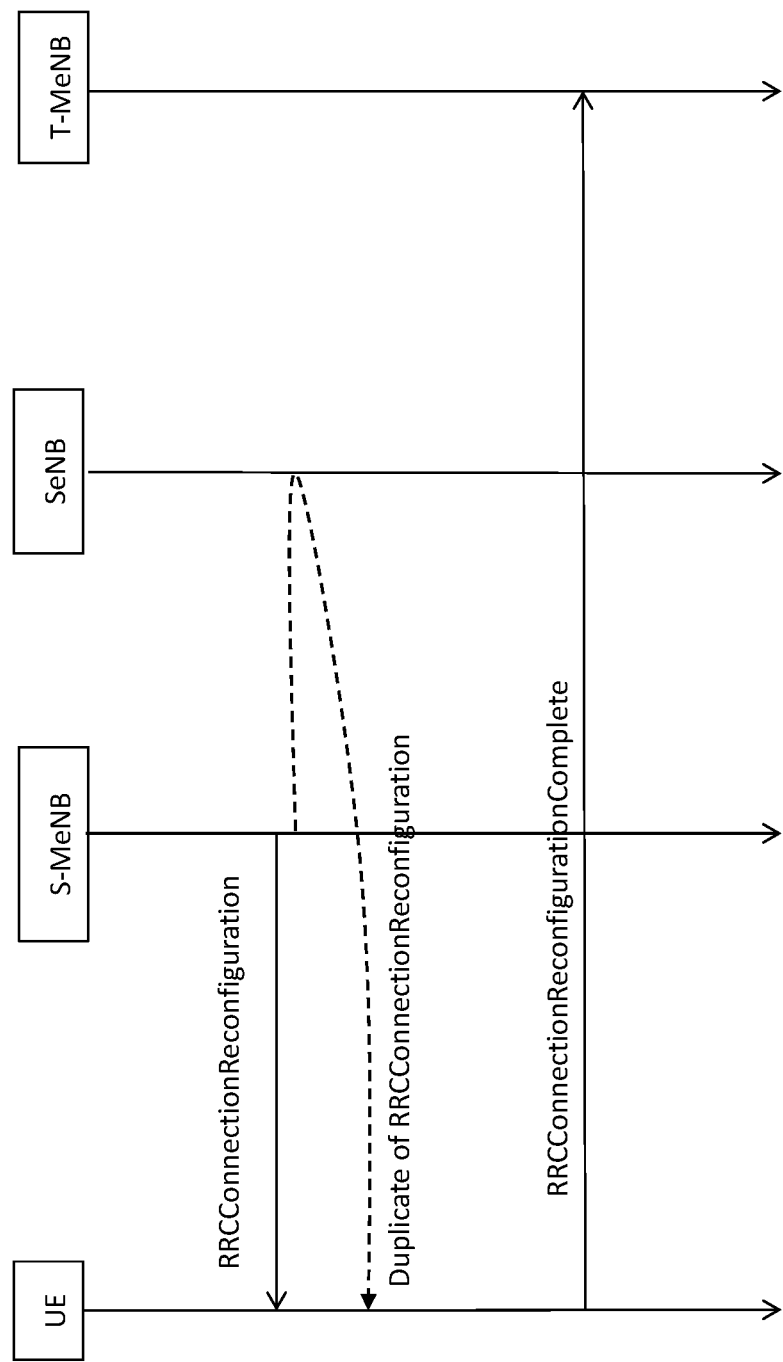
FIG. 5 illustrates an example Radio Resource Control (RRC) procedure for the case when the secondary cell group (SCG) is released during inter-MeNB Handover.
Figure 6:
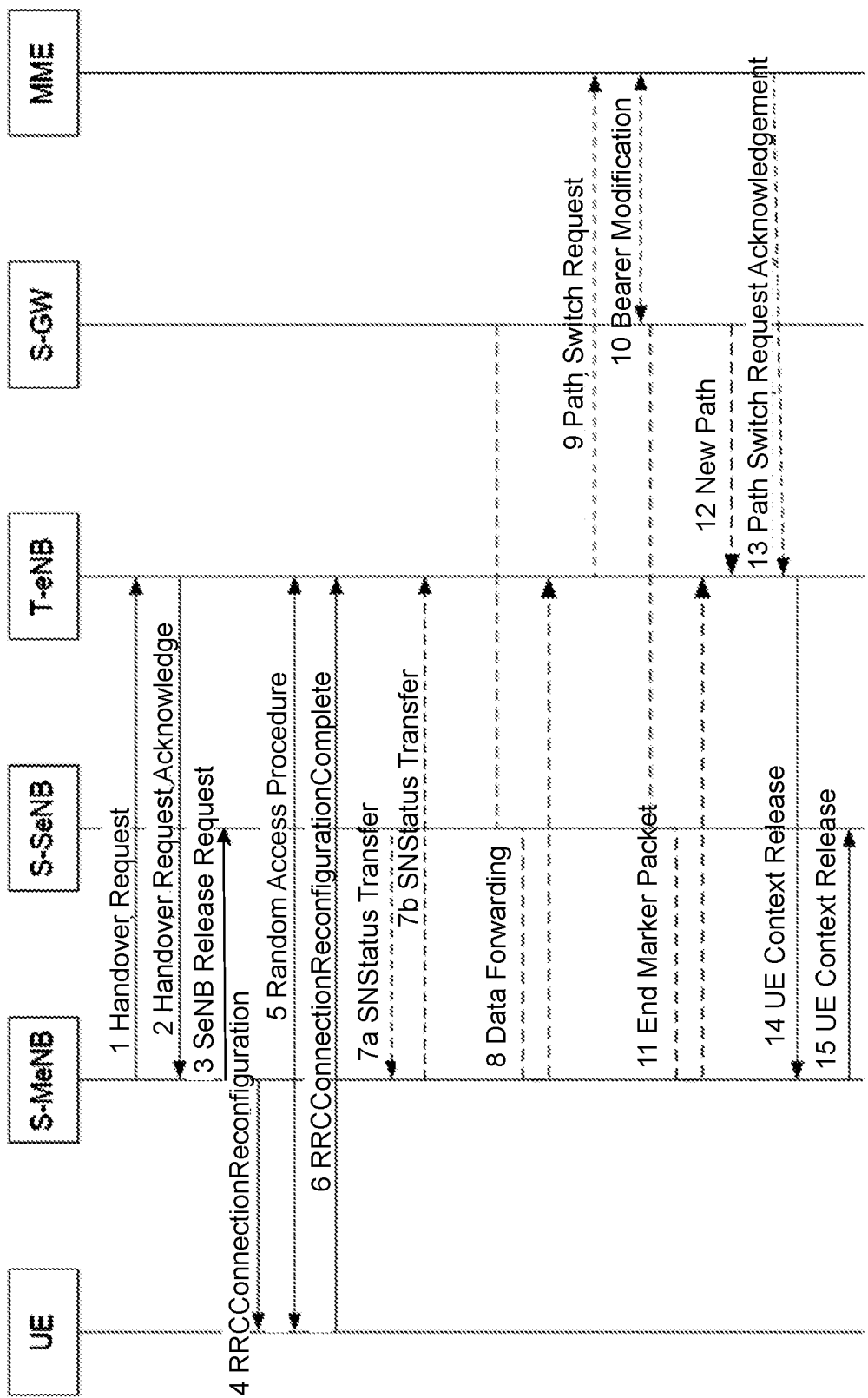
FIG. 6 illustrates an example MeNB to eNB change procedure of TS 36.300.

However, according to certain embodiments, for the procedure over X2 and RRC, as compared to LTE procedure of FIG. 5, and in the scenario where RRC diversity is used for HO command, the MeNB may not send the release indication indicated as Message 3 of FIG. 5. Instead, the MeNB may send a message to the SeNB that includes an indication that the SeNB is to release resources needed to serve user plane (UP) data. According to a particular embodiment where data forwarding is needed, the MeNB may further provide, in the message, data forwarding addresses to the source SeNB. According to certain embodiments, reception of this message by the SeNB triggers the SeNB to stop providing user data to the wireless device, and if applicable, to start data forwarding. However, the SeNB continues transmitting control plane data, which may include PDCP PDUs that are associated with the split SRB to the wireless device.

In a particular embodiment, for example, the Source MeNB (S-MeNB) may inform the SeNB that it can stop transmitting pending or new control data (i.e., PDCP PDUs associated with the SRB) to the wireless device. In one alternative embodiment, this may be done when the S-MeNB deduces, that the wireless device has received the handover command based on radio link control acknowledgement (RLC ACK) or a hybrid automatic repeat request acknowledgement (HARQ ACK). In a particular embodiment, the T-MeNB may inform the SeNB directly or via S-MeNB that UE has that the handover command and may stop transmitting pending or new PDCP PDUs to the wireless device.

In another embodiment, the SeNB may deduce by itself that the wireless device has released the SeNB. For this, the MeNB may indicates to the SeNB that the radio resource control packet data unit (RRC PDU) includes the handover command. After sending this message to the wireless device, the SeNB can deduce from the RLC ACK or HARQ ACK that the wireless device has left. In some embodiments, the wireless device does not release the SeNB configuration immediately when performing handover. Instead, the wireless device may send HARQ and/or RLC feedback to the SeNB. In this case, the wireless device can be configured with the timer how long it continues to communicate with the SeNB.

In a particular embodiment, where the SeNB deduces that the RRC message is delivered successfully to the wireless device, the SeNB may inform the MeNB about the successful handover command. In this case, the MeNB may stop transmitting the HO command to the UE and potentially delete the UE context.

According to certain other embodiments, the SeNB may be kept during MeNB handover. The RRC procedure in this scenario may include:

It is assumed that Dual Connectivity and split SRB are configured for the wireless device.
Network decides to trigger handover towards T-MeNB.
The handover command, which may include RRCConnectionReconfiguration with mobilityControlInfo, is sent towards the wireless device over the MeNB and the SeNB
The wireless device receives the first version of the handover command. When receiving handover command, the wireless device triggers handover towards the T-MeNB but keeps the SeNB.
The duplicate of the handover command comes later.
According to certain embodiments, methods to detect and discard this duplicate are discussed below.

Figure 7:
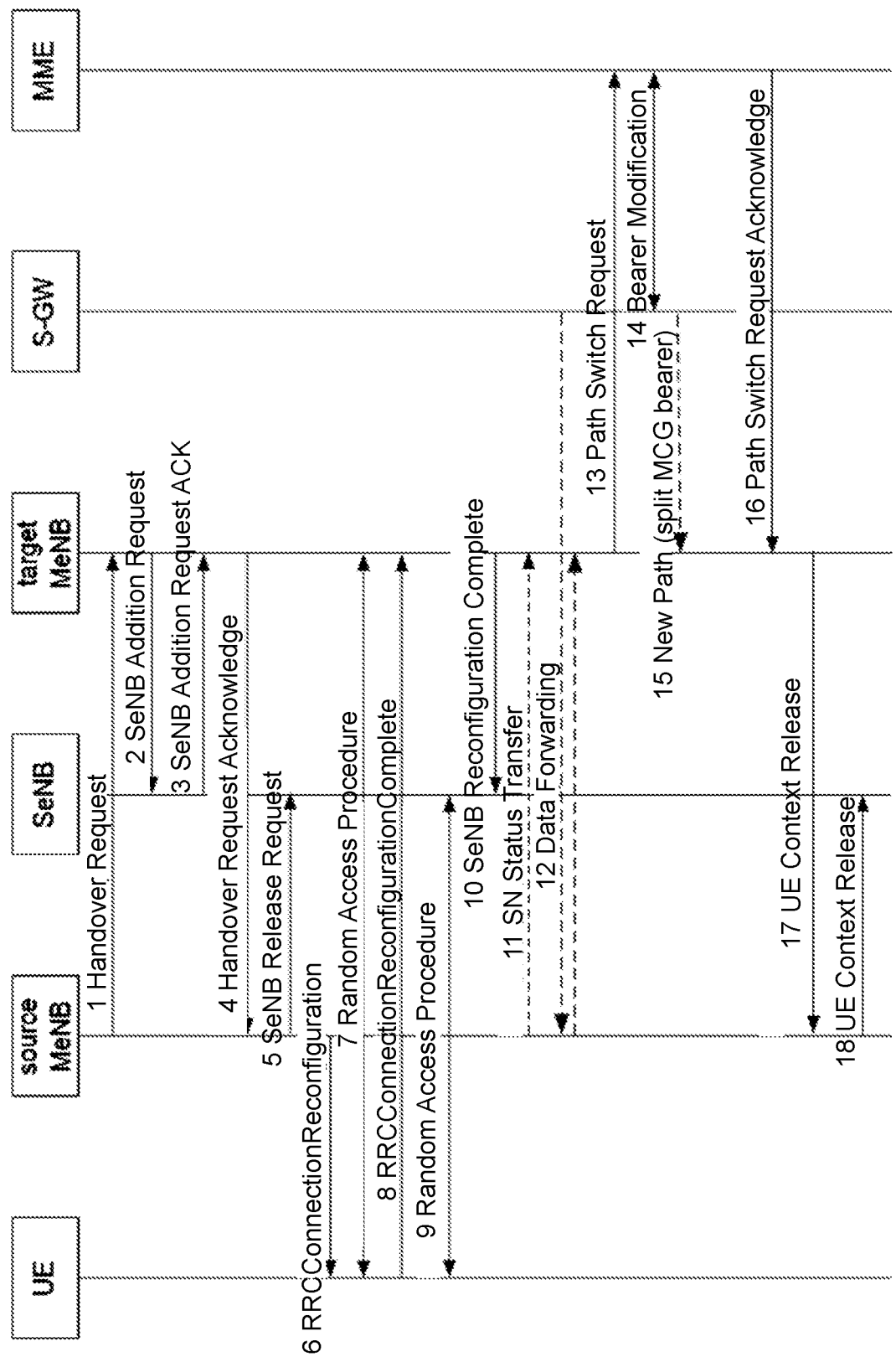
FIG. 7 illustrates an example inter-MeNB handover without SeNB change.

According to certain embodiments, for example, FIG. 7 may be taken as a baseline for the procedure over X2 and RRC. However, as compared to the LTE procedure depicted in FIG. 7, in the scenario where RRC diversity is used for the handover commend, the MeNB may not send the release indication in Message 5. Instead, the MeNB may send an indication to the SeNB that the SeNB is to continue to transmit the packets (either SRB only or both SRB and DRBs) to the wireless device.

According to certain embodiments, as during handover, security keys may be changed in the MeNB. Those should be also changed in the SeNB. Because of this, a SCG change procedure may be triggered to change keys in the SeNB. A PDCP/RLC re-establishment may also be triggered. For this purpose, in a modified step 5 of FIG. 7, the MeNB may provide a new key, which may be referred to as a S-KeNB* in a LTE implementation or a S-KgNB or SgNB in an NR implementation, to the wireless device. According to a particular embodiment, as a reply indication in Msg5, there may be an additional step, which may be considered a Message 5b, where the SeNB/SgNB gives the new RRC configuration to the wireless device. This may be transmitted to the SeNB/SgNB via the MeNB/MgNB.

The problem with previous procedures may be that the wireless device and the SeNB/SgNB are not synchronized when the key change occurs. Accordingly, a wireless device and the SeNB/SgNB may synchronize to change the key from the old key (S-KeNB or S-KgNB) to the new key (S-KeNB* or S-KgNB*) so that the wireless device and the secondary node know the timing of the key change and are able to comprehend each other's messages without any interruption or failure. In certain embodiments, for example, it is proposed that the SeNB/SgNB provide new C-RNTI in the new configuration transmitted in the new additional message 5b. After the wireless device has applied the new RRC configuration, the wireless device knows that all packets with old C-NRTI should be discarded in the PDCP level, in a particular embodiment. Alternatively, in another embodiment, the wireless device may know to ignore the whole reception. Similarly, when the SeNB/SgNB detects the new C-RNTI in the random access, the SeNB/SgNB knows that new keys and new configurations should be applied.

According to certain embodiments, where the SeNB/SgNB deduces that the RRC message was delivered successfully to the wireless device (such as, for example, based on C-RNTI), the SeNB/SgNB may inform the MeNB/MgNB about that. Thereafter, the MeNB/MgNB may stop transmitting the handover command to the wireless device and potentially delete the UE context, in a particular embodiment.

In a particular embodiment, the wireless device may discard all packets that the wireless device receives from the SeNB/SgNB but cannot decipher after the handover. However, as there is a security risk in this approach, this may be done for only a limited time after the handover, in a particular embodiment. The network may configure how long the wireless device can discard the PDCP PDUs, in a particular embodiment.

Some of the embodiments contemplated herein will now be described more fully with reference to the following accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
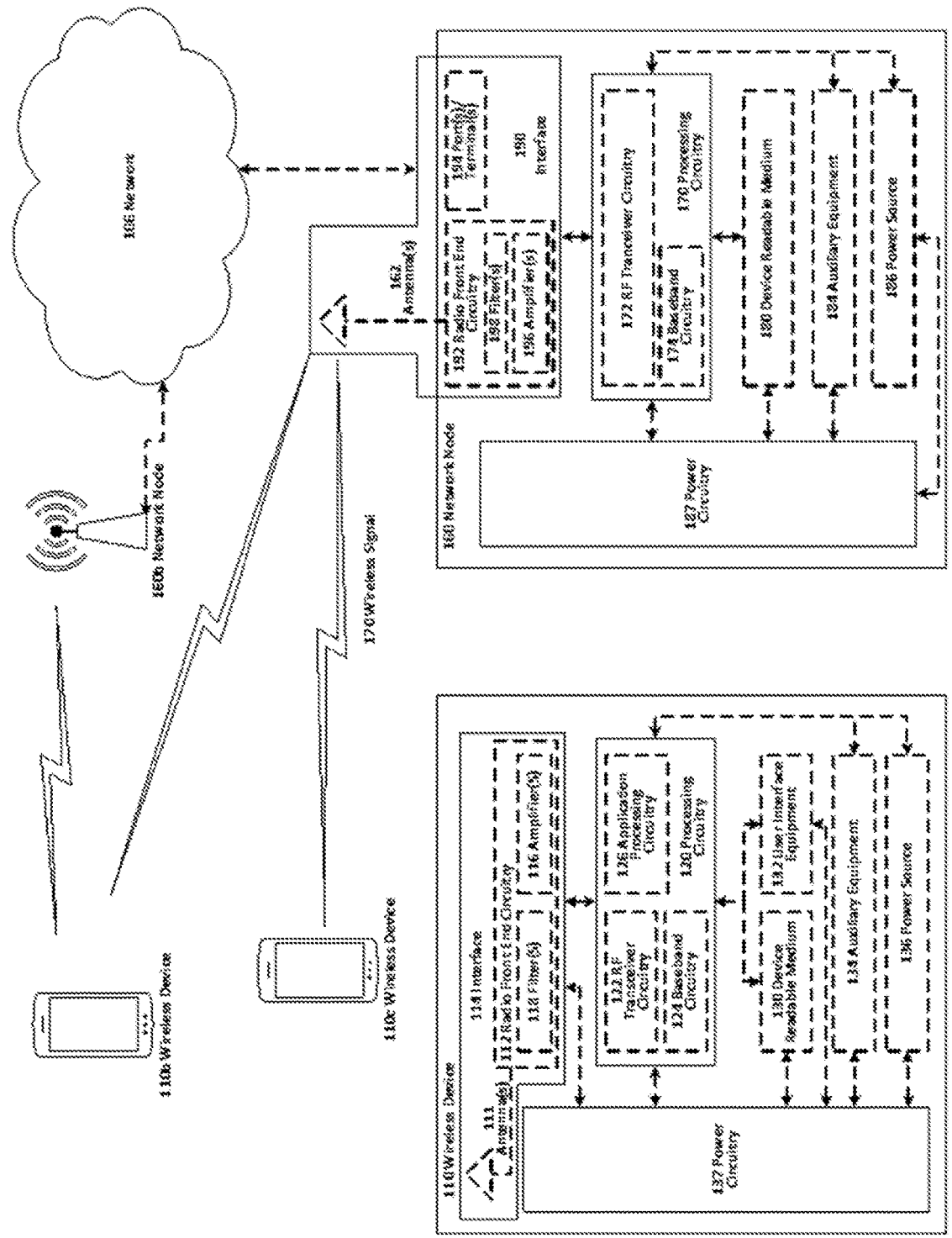
FIG. 8 illustrates an example wireless communication network for performing handover of a wireless device receiving split signalling radio bearer (SRB), in accordance with certain embodiments.

FIG. 8 illustrates an example wireless communication network for performing handover of a wireless device receiving split SRB, in accordance with some embodiments. However, the subject matter described herein may be implemented in any appropriate type of system using any suitable components, and the wireless communication network illustrated in FIG. 8 is merely one example of a wireless network for implementing the disclosed techniques for performing handover of a wireless device receiving split SRB.

For simplicity, the wireless communication network of FIG. 8 only depicts network 106, network nodes 160 and 160*b*, and wireless devices 110, 110*b*, and 110*c*. The wireless communication network may further include any additional elements suitable to support communication between wireless devices or between a wireless device and another communication device, such as a landline telephone. Of the illustrated components, network node 160 and wireless device 110 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs), and gNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 160 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 8, Network node 160 includes processing circuitry 170, device readable medium 180, interface 190, user interface equipment 182, auxiliary equipment 184, power source 186, power circuitry 187, and antenna 162. Although network node 160 illustrated in the example wireless communication network of FIG. 8 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features or benefits discussed herein.

In some embodiments, processing circuitry 170 may include a system on a chip (SOC) and may include one or more of radio frequency (RF) transceiver circuitry 172, and baseband processing circuitry 174 in addition to application processing circuitry 176. In some embodiments, radio frequency (RF) transceiver circuitry 172, baseband processing circuitry 174, and application processing circuitry 176 may be on separate chips (or sets of chips). In alternative embodiments, part or all of baseband processing circuitry 174 and application processing circuitry 176 may be combined into one chip or set of chips, and RF transceiver circuitry 172 may be on a separate chip or set of chips. In still alternative embodiments, part or all of RF transceiver circuitry 172 and baseband processing circuitry 174 may be on the same chip or set of chips, and application processing circuitry 176 may be on a separate chip or set of chips. In yet other alternative embodiments, part or all of RF transceiver circuitry 172, baseband processing circuitry 174, and application processing circuitry 176 may be combined in the same chip or set of chips.

In certain embodiments, some or all of the functionality described herein as being provided by a network node, base station, eNB or other such network device may be provided by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Processing circuitry 170 may be configured to perform any determining operations described herein as being performed by a network node. Determining as performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 may be used in the wired or wireless communication of signalling and/or data between network node 160, network 106, and/or wireless devices 110. Interface 190 may be transceiver circuitry that comprises one or more ports or terminals 194 that may perform any formatting, coding, or translating that may be needed to allow network node 160 to send and receive data, for example to and from network 106 over a wired connection. Interface 190 may also include radio front end circuitry 192 that may be coupled to or a part of antenna 162. Radio front end circuitry 192 may be coupled to various filters 198 and amplifiers 196. Radio front end circuitry 192 may be connected to antenna 162 and processing circuitry 170. Radio front end circuitry may be configured to condition signals communicated between antenna 162 and processing circuitry 170. In certain alternative embodiments, network node 160 may not include separate radio front end circuitry 192, instead, processing circuitry 170 may comprise radio front end circuitry and may be connected to antenna 162 without separate radio front end circuitry 192. Radio front end circuitry 192 may receive digital data that is to be sent out to other network nodes or wireless devices via a wireless connection. The radio may convert the digital data into a radio signal having the appropriate channel and bandwidth parameters using a combination of filters 198 and/or amplifiers 196. The radio signal may then be transmitted via antenna 162 to the appropriate recipient (e.g., wireless device 110). These, or similar, components may also work for wireless signals that are received by antenna 162 and converted into digital data for use by processing circuitry 170.

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and may be configured to supply the components network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

User interface equipment 182 may include input interfaces, devices and circuits, and output interfaces, devices and circuits. User interface equipment 182 is configured to allow input of information into network node 160 and is connected to processing circuitry 170 to allow processing circuitry 170 to process the input information. User interface equipment 182 may include, for example, a microphone, a proximity or other sensor, keys/buttons, a touch display, one or more cameras, a USB port, or other input elements. User interface equipment 182 is also configured to allow output of information from network node 160, and to allow processing circuitry 170 to output information from network node 160. User interface equipment 182 may include, for example, a speaker, a display, vibration generating circuitry, a USB port, a headphone interface, or other output elements. Using one or more input and output interfaces of user interface equipment 182, network node 160 may communicate with end users and/or the wireless network and allow them to benefit from the functionality described herein. For example, user interface equipment 182 may be used when installing, configuring, troubleshooting, repairing, or otherwise working on network node 160.

In the present disclosure, the terms wireless device, UE, terminal, handset, etc. may be used interchangeably to denote a device that communicates with the infrastructure. The terms should not be construed as to mean any specific type of devices, and the solutions described here are applicable to all devices that use the concerned solution to solve the problems as described. Similarly, a network node and/or base-station is intended to denote any node in the infrastructure that communicates with the wireless device. Different names may be applicable, and the functionality of the network node may also be distributed in various ways. For example, there could be a radio head terminating parts of the radio protocols and a centralized unit that terminates other parts of the radio protocols. Such implementations are not distinguished here. Instead, the terms network node and base-station will refer to all alternative architectures that can implement the concepts, features and/or benefits disclosed herein. Likewise, alternative embodiments of network node 160 may include additional components beyond those shown in FIG. 8 that may be responsible for providing certain aspects of the network node's functionality, including any of the functionality described herein and/or any functionality necessary to support the subject matter described herein.

As used herein, wireless device refers to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, user equipment (UE), smart phone, mobile phone, cell phone, voice over IP (VoIP) phone, wireless local loop phone, desktop computer, personal data assistant (PDA), wireless cameras, gaming terminal devices, music storage, playback appliances, wearable terminal devices, wireless endpoints, mobile stations, tablets, laptops, laptop-embedded equipment (LEE), laptop-mounted equipment (LME), USB dongles, smart devices, wireless customer-premise equipment (CPE) and vehicle-mounted wireless terminal devices. A wireless device may support device-to-device (D2D) communication, for example by implementing a 3GPP standard for sidelink communication and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Wireless device 110 may include antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies integrated into wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

Interface 114 may be transceiver circuitry comprising various radio front end circuitry 112, filters 118 and amplifiers 116. Interface 114 is connected to antenna 111 and processing circuitry 120 and is configured to condition signals communicated between antenna 111 and processing circuitry 120. Radio front end circuitry 112 may be coupled to or a part of antenna 111. Radio front end circuitry 112 may be coupled to various filters 118 and amplifiers 116. Radio front end circuitry may be configured to condition signals communicated between antenna 111 and processing circuitry 120. In some embodiments, wireless device 110 may not include separate radio front end circuitry 112, rather processing circuitry 120 may comprise radio front end circuitry and may be connected to antenna 111. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111 to the appropriate recipient. These, or similar, components may also work for wireless signals that are received by antenna 111 and converted into digital data for use by processing circuitry 120.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

Processing circuitry 120 of wireless device 110 may comprise a SOC and may include one or more of RF transceiver circuitry 122, and baseband processing circuitry 124, in addition to application processing circuitry 126. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being provided by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110 but are enjoyed by wireless device 110 as a whole, and/or by end users and the wireless network generally.

Processing circuitry 120 may be configured to perform any determining operations described herein as being performed by a wireless device. Determining as performed by processing circuitry 120 may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store instructions, such as a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a remotely hosted website or application. User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input elements. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output elements. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet) or photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 9:
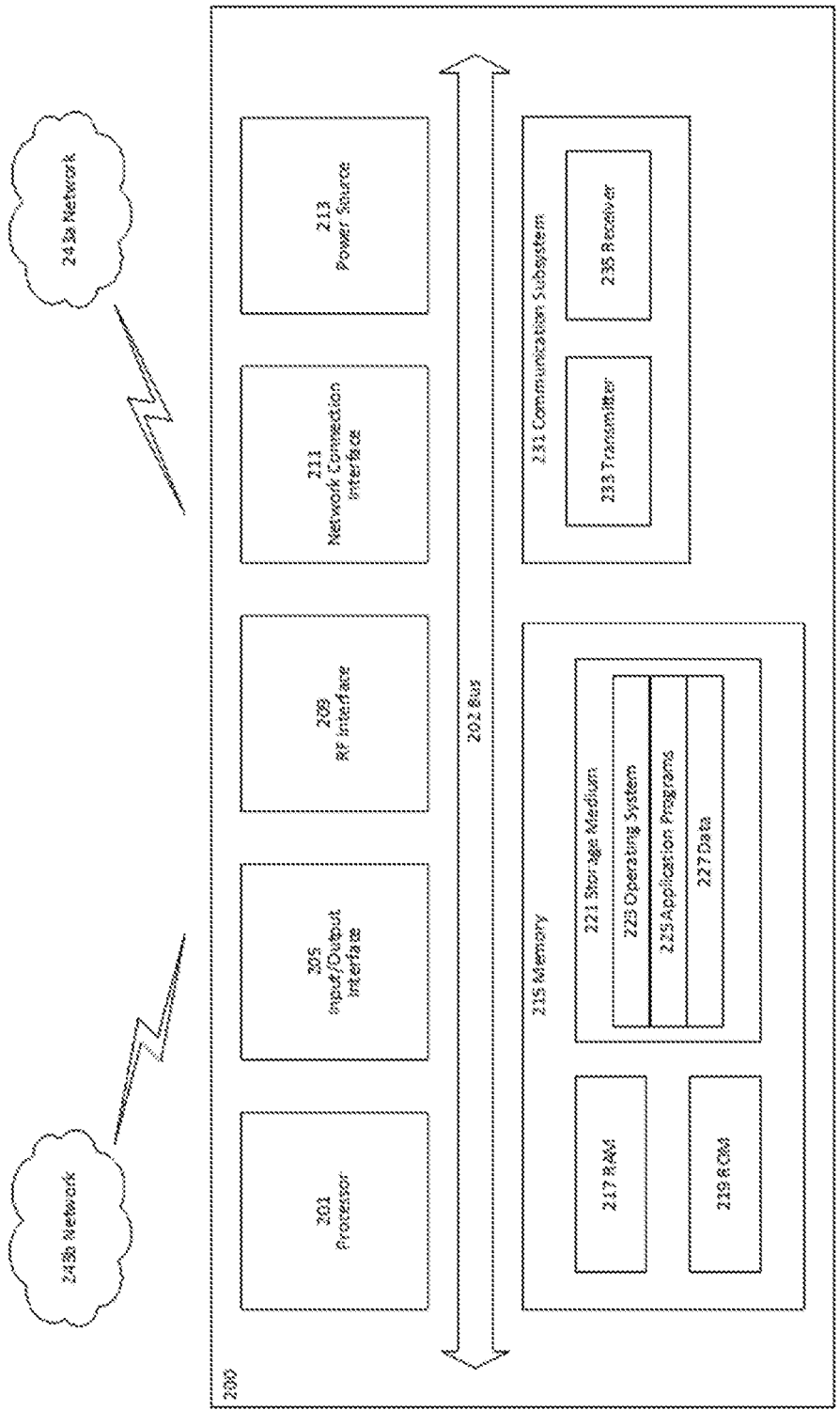
FIG. 9 illustrates an exemplary user equipment (UE) for receiving split SRB during handover, in accordance with certain embodiments.

FIG. 9 illustrates an example UE 200 for receiving split SRB during handover, in accordance with some embodiments. As used herein, UE 200 may not necessarily have a user in the sense of a human user who owns and/or operates the relevant device. Instead, UE 200 may represent a device that is intended for sale to, or operation by, a human user but which may not, or which may not initially, be associated with a specific human user. UE 200, as illustrated in FIG. 9, is one example of a wireless device configured for communication in accordance with one or more communication standards promulgated by the $3^{rd}$ Generation Partnership Project (3GPP), such as 3GPP's GSM, UMTS, LTE, and/or 5G standards.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 may include operating system 223, application program 225, data 227, or the like. Specific devices may utilize all of the components shown in FIG. 9 or only a subset of the components. The level of integration between the components may vary from device to device. Further, specific devices may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a mouse, a trackball, a directional pad, a trackpad, a presence-sensitive input device, a display such as a presence-sensitive display, a scroll wheel, a camera (e.g., a digital camera, a digital video camera, a web camera, etc.), a microphone, a sensor, a smartcard, and the like. The presence-sensitive input device may include a digital camera, a capacitive or resistive touch sensor, a digital video camera, a web camera, a microphone, a sensor, or the like to sense input from a user. The presence-sensitive input device may be combined with the display to form a presence-sensitive display. Further, the presence-sensitive input device may be coupled to processing circuitry 201. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243a. Network 243a may encompass wired and wireless communication networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other nodes over a communication network according to one or more communication protocols known in the art or that may be developed, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols known in the art or that may be developed, such as IEEE 802.xx, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and wireless communication networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 performs the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
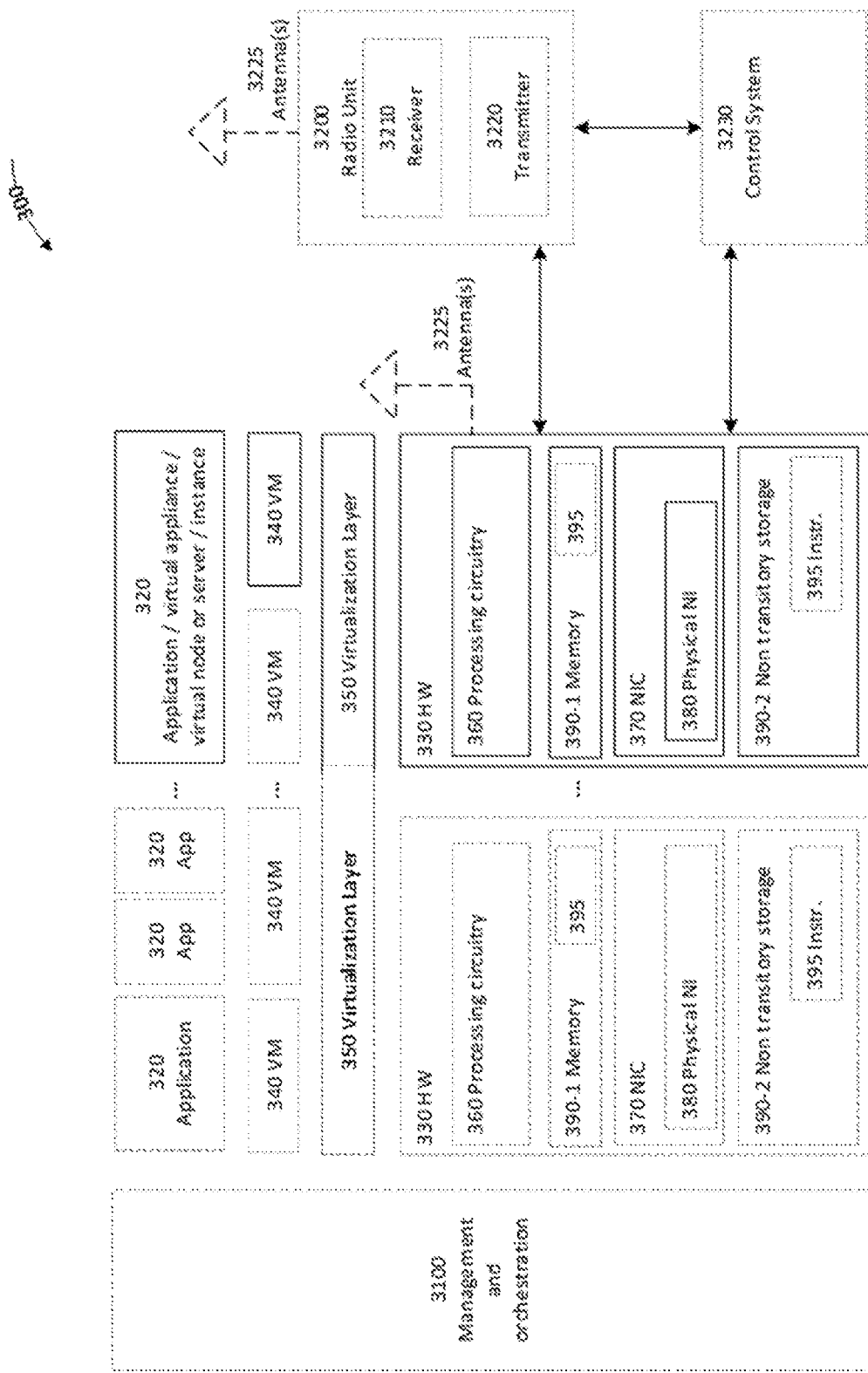
FIG. 10 illustrates an example virtualization environment, in accordance with certain embodiments.

FIG. 10 illustrates an example virtualization environment 300 in which functions implemented by some embodiments may be virtualized, in accordance with certain embodiments. In the present context, virtualizing means creating virtual versions of apparatus or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 run in virtualization environment 300 which provides hardware 330 comprising processing circuitry 360 and memory 390. Memory 390 contains instructions 395 executable by processing circuitry 360 whereby application 320 is operative to provide any of the relevant features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware devices may also include non-transitory, persistent, machine-readable storage media 390-2 having stored therein software 395 and/or instruction executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node, with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, a virtual machine 340 is a software implementation of a physical machine that runs programs as if they were executing on a physical, non-virtualized machine. Each of virtual machines 340, and that part of the hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be affected with the use of control system 3230 which may alternatively be used for communication between the hardware nodes 330 and radio units 3200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 11:
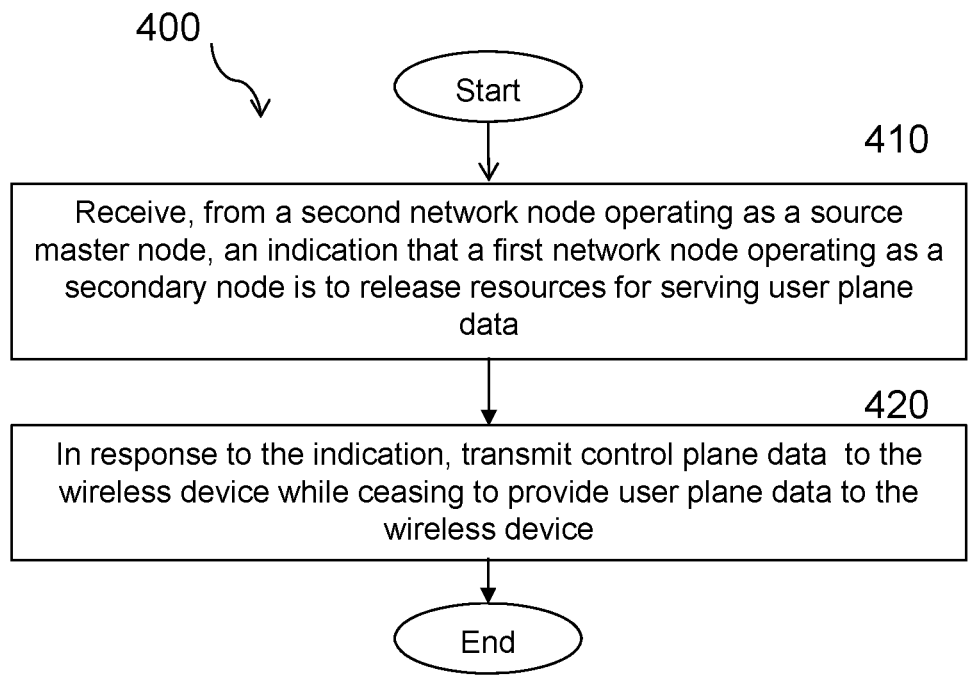
FIG. 11 illustrates an example method by a network node for performing handover of a wireless device receiving split SRB, according to certain embodiments.

FIG. 11 illustrates an example method 400 by a first network node 160 for performing handover of a wireless device 110 receiving split SRB, according to certain embodiments. Specifically, wireless device 110 may have dual connectivity to first network node 160, which operates as a secondary node (i.e., SeNB or SgNB), and a second network node 160b, which operates as a master node (i.e., S-MeNB or S-MgNB). The method 400 may be performed during a handover of wireless device 110 from the second network node 160b (S-MeNB/S-MgNB) to a third network node operating as a target master node (T-MeNB/T-MgNB).

At step 410, first network node 160 may receive, from the second network node 160b, an indication that the first network node 160 is to release resources for serving user plane data.

At step 420, in response to the indication, first network node 160 transmits control plane data to wireless device 110 while ceasing to provide user plane data to wireless device 110.

In a particular embodiment, the control plane data may include one or more RRC PDUs that includes a handover command. If, after transmitting such control plane data, first network node 160 receives an acknowledgement indicating that the RRC PDU was successfully received by wireless device 110, first network node 160 may determine that wireless device 110 has been successfully handed over to third network node 160. Thereafter, first network node 160 may cease transmitting any pending or new control plane data to wireless device 110.

In a particular embodiment, first network node 160 may transmit, to the second network node 160b, an indication that the RRC PDU was successfully received by wireless device 110 to prompt second network node 160b to cease transmitting handover commands to the wireless device 110 or delete a UE context associated with wireless device 110.

In a particular embodiment, first network node 160 may also receive, from the second network node 160b, a data forwarding address associated with the third network node. Thereafter, when first network node 160 receives user plane data from the second network node 160b, first network node 160 may forward the user plane data to the data forwarding address associated with the third network node.

According to certain embodiments, first network node 160 may also receive an indication that first network node 160 can stop transmitting control plane data to wireless device 110. In response to the indication, first network node 160 may cease transmitting any pending or new control plane data to wireless device 110. In a particular embodiment, the indication to stop transmitting control plane data may be received from the second network node 160b operating as the S-MeNB/S-MgNB. In another particular embodiment, the indication may be received from the third network node operating as the T-MeNB/T-MgNB.

In a particular embodiment, wireless device 110 may also have dual connectivity with a fourth network node operating as another slave node (i.e., a second SeNB/SgNB).

Figure 12:
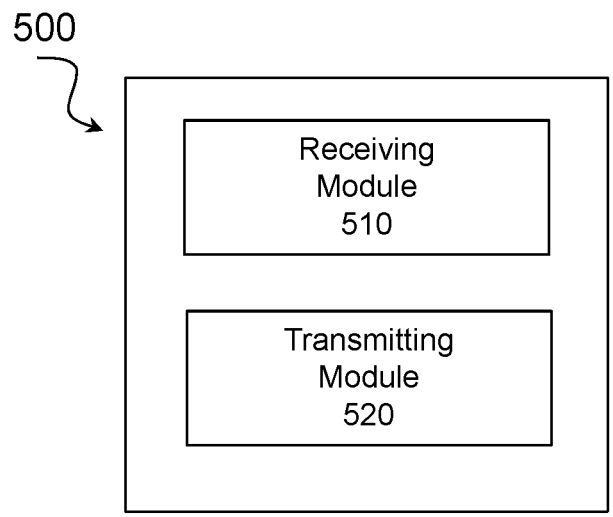
FIG. 12 illustrates an example virtual computing device for performing handover of a wireless device receiving split SRB, according to certain embodiments.

In certain embodiments, the method for performing handover of a wireless device receiving split SRB may be performed by a virtual computing device. FIG. 12 illustrates an example virtual computing device 500 for performing handover of a wireless device receiving split SRB, according to certain embodiments. In certain embodiments, virtual computing device 500 may include modules for performing steps similar to those described above with regard to the method illustrated and described in FIG. 11. For example, virtual computing device 500 may include at least one receiving module 510, a transmitting module 520, and any other suitable modules for performing handover of a wireless device receiving split SRB handover. In some embodiments, one or more of the modules may be implemented using processing circuitry 170 of FIG. 8. In certain embodiments, the functions of two or more of the various modules may be combined into a single module.

The receiving module 510 may perform the receiving functions of virtual computing device 500. For example, in a particular embodiment, receiving module 510 may receive, from the second network node 160b operating as the master node, an indication that the first network node 160 is to release resources for serving user plane data.

The transmitting module 520 may perform the transmitting functions of virtual computing device 500. For example, in a particular embodiment, transmitting module 520 may transmit control plane data to wireless device 110 while ceasing to provide user plane data to wireless device 110.

Other embodiments of virtual computing device 500 may include additional components beyond those shown in FIG. 12 that may be responsible for providing certain aspects of the network node's functionality, including any of the functionality described above and/or any additional functionality (including any functionality necessary to support the solutions described above). The various different types of network nodes 160 may include components having the same physical hardware but configured (e.g., via programming) to support different radio access technologies, or may represent partly or entirely different physical components.

Figure 13:
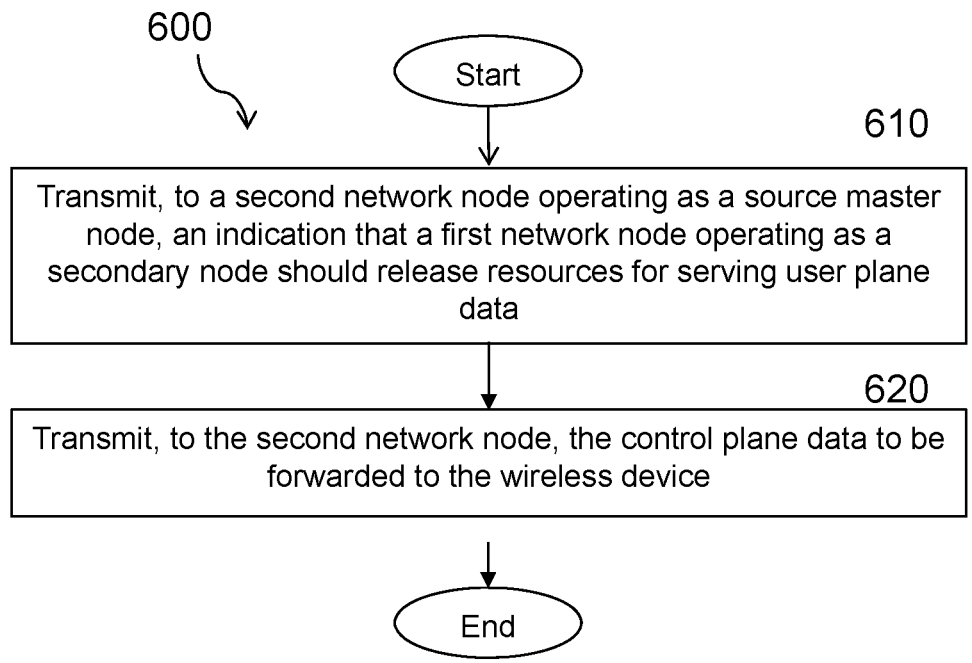
FIG. 13 illustrates another example method by a network node for performing handover of a wireless device receiving split SRB, according to certain embodiments.

FIG. 13 illustrates another example method 600 by a first network node 160 for performing handover of a wireless device 110 receiving split SRB, according to certain embodiments. Specifically, wireless device 110 may have dual connectivity to first network node 160, which operates as a source master node (i.e., S-MeNB/S-MgNB), and a second network node 160b, which operates as a secondary node (i.e., SeNB/SgNB). The method 400 may be performed during a handover of wireless device 110 from the first network node 160 (S-MeNB/S-MgNB) to the third network node 160b operating as a target master node (T-MeNB/T-MgNB).

At step 610, first network node 160 may transmit, to the second network node 160b, an indication that the second network node 160b is to release resources for serving user plane data to wireless device 110 while continuing to transmit control plane data to the wireless device 110.

At step 620, first network node 160 may transmit, to the second network node 160b, the control plane data to be forwarded to wireless device 110.

In a particular embodiment, first network node 160 may also transmit a data forwarding address associated with the third network node 160 for use by second network node 160b in forwarding the control plane data to wireless device 110.

In a particular embodiment, first network node 160 may determine that the handover from the first network node 160 to third network node was successful. Thereafter, first network node 160 may transmit, to second network node 160b, an indication that second network node 160b can stop transmitting control plane data to wireless device 110.

In a particular embodiment, the control plane data may include a RRC PDU that includes a handover command, and the method further include receiving, by the first network node, an indication that the RRC PDU was successfully received by the wireless device. The indication may be received from second network node 160b. In response to the indication, first network node 160 may cease to transmit handover commands to wireless device 110 and, in a particular embodiment, delete a UE context associated with wireless device 110.

Figure 14:
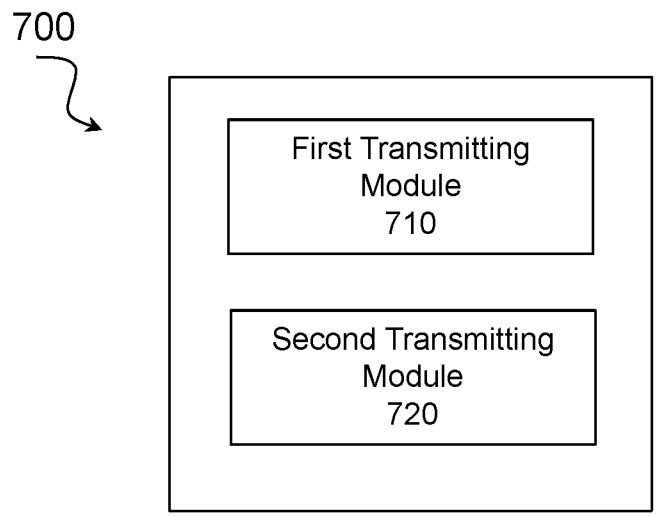
FIG. 14 illustrates another example virtual computing device for performing handover of a wireless device receiving split SRB, according to certain embodiments.

In certain embodiments, the method for performing handover of a wireless device receiving split SRB may be performed by a virtual computing device. FIG. 14 illustrates another example virtual computing device 700 for performing handover of a wireless device receiving split SRB r, according to certain embodiments. In certain embodiments, virtual computing device 700 may include modules for performing steps similar to those described above with regard to the method illustrated and described in FIG. 13. For example, virtual computing device 700 may include a first transmitting module 710, a second transmitting module 720, and any other suitable modules for performing handover of a wireless device receiving split SRB. In some embodiments, one or more of the modules may be implemented using processing circuitry 170 of FIG. 8. In certain embodiments, the functions of two or more of the various modules may be combined into a single module.

The first transmitting module 710 may perform certain of the transmitting functions of virtual computing device 700. For example, in a particular embodiment, first transmitting module 710 may transmit, to the second network node 160, an indication that the second network node 160 is to release resources for serving user plane data to wireless device 110 while continuing to transmit control plane data to the wireless device 110.

The second transmitting module 720 may perform certain other of the transmitting functions of virtual computing device 700. For example, in a particular embodiment, second transmitting module 720 may transmit, to the second network node 160, the control plane data to be forwarded to wireless device 110.

Other embodiments of virtual computing device 700 may include additional components beyond those shown in FIG. 14 that may be responsible for providing certain aspects of the network node's functionality, including any of the functionality described above and/or any additional functionality (including any functionality necessary to support the solutions described above). The various different types of network nodes 160 may include components having the same physical hardware but configured (e.g., via programming) to support different radio access technologies, or may represent partly or entirely different physical components.

Figure 15:
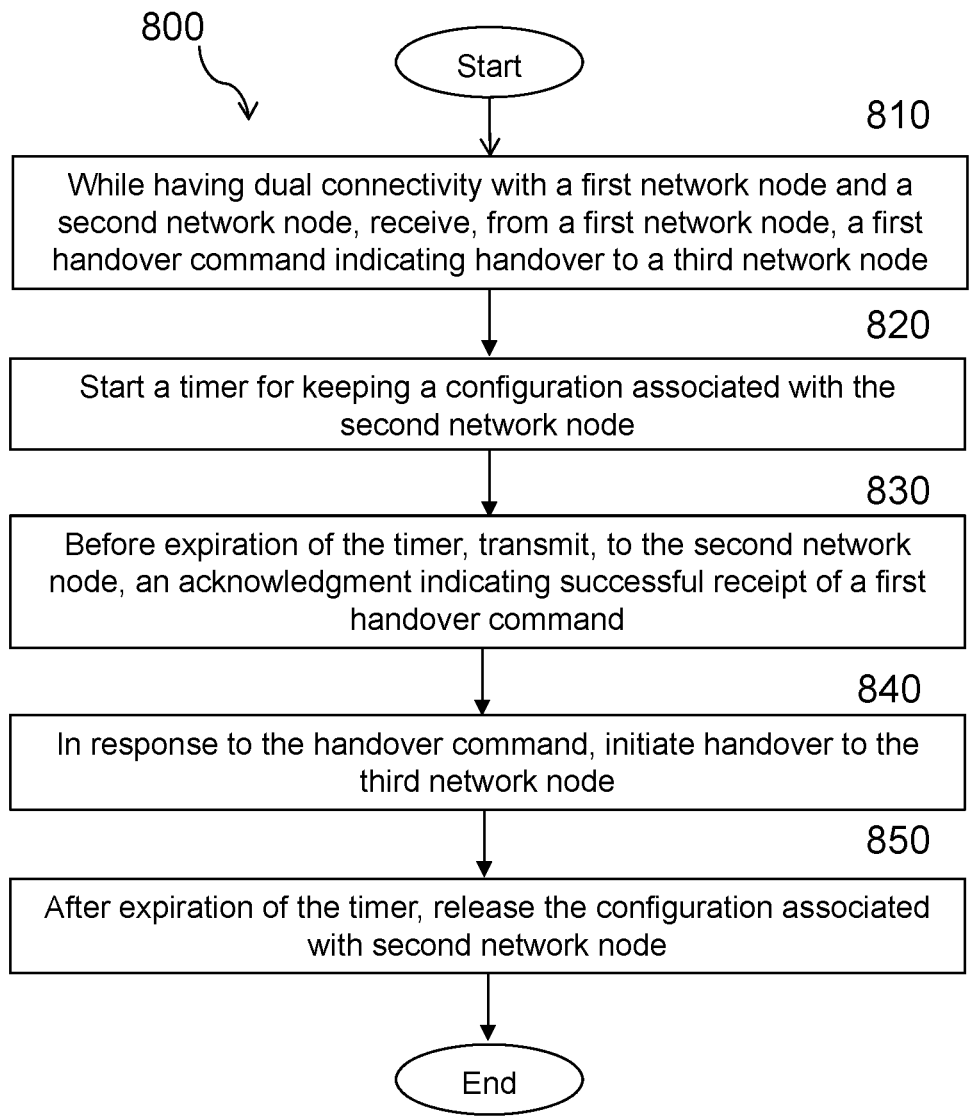
FIG. 15 illustrates an example method by a wireless device for receiving split SRB during handover, according to certain embodiments.

FIG. 15 illustrates an example method 800 by a wireless device 110 receiving split SRB, according to certain embodiments. Specifically, wireless device 110 may have dual connectivity to a first network node 160, which operates as a source master node (i.e., S-MeNB/S-MgNB), and a second network node 160b, which operates as a secondary node (i.e., SeNB/SgNB). The method 800 may be performed during a handover of wireless device 110 from the first network node 160 (S-MeNB/S-MgNB) to a third network node operating as a target master node (T-MeNB/T-MgNB).

At step 810, wireless device 110 receives, from the first network node 160, a first handover command indicating handover to the third network node. Wireless device 110 starts a timer for keeping a configuration associated with the second network node 160b at step 820.

At step 830, before of the expiration of the timer, wireless device 110 transmits, to the second network node 160b, an acknowledgement indicating successful receipt of the first handover command. In response to the first handover command, wireless device 110 initiates a handover to the third network node operating at step 840.

At step 850, and after expiration of the timer, wireless device 110 releases the configuration associated with second network node 160b.

Figure 16:
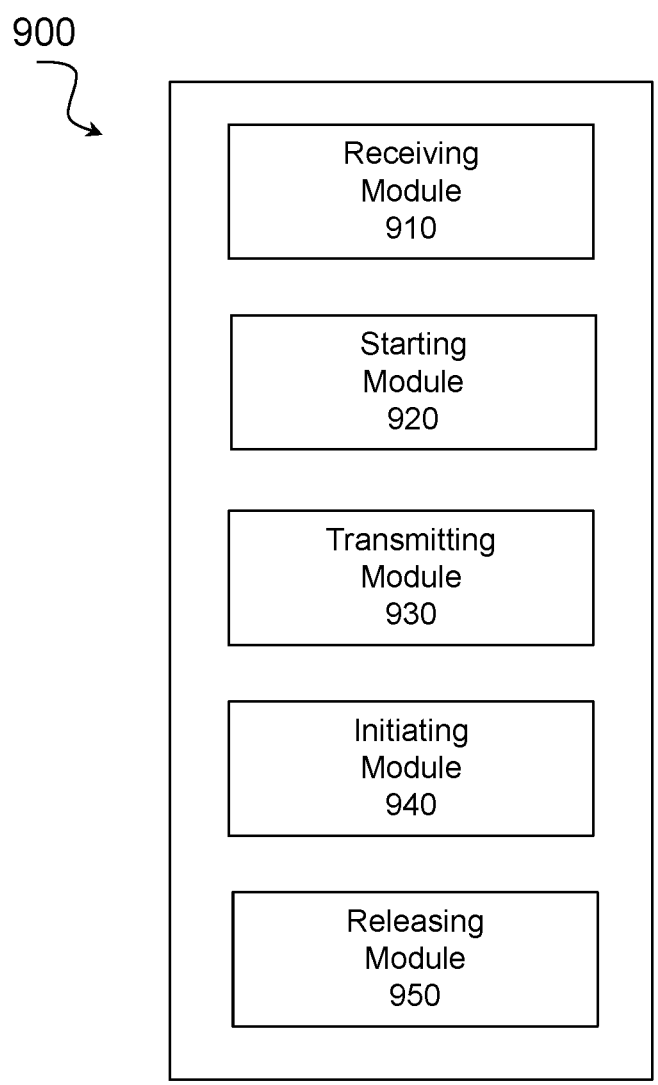
FIG. 16 illustrates an example virtual computing device for receiving split SRB during handover, according to certain embodiments.

In certain embodiments, the method for receiving split SRB handover may be performed by a virtual computing device. FIG. 16 illustrates an example virtual computing device 900 for receiving split SRB handover, according to certain embodiments. In certain embodiments, virtual computing device 900 may include modules for performing steps similar to those described above with regard to the method illustrated and described in FIG. 15. For example, virtual computing device 900 may include a receiving module 910, a starting module 920, a transmitting module 930, an initiating module 940, a releasing module 950, and any other suitable modules for receiving split SRB handover. In some embodiments, one or more of the modules may be implemented using processor 201 of FIG. 9. In certain embodiments, the functions of two or more of the various modules may be combined into a single module.

The receiving module 910 may perform the receiving functions of virtual computing device 900. For example, in a particular embodiment, receiving module 910 may receive, from the first network node 160, a first handover command indicating handover to the third network node.

The starting module 920 may perform the starting functions of virtual computing device 900. For example, in a particular embodiment, starting module 920 may start a timer for keeping a configuration associated with the second network node at step 820.

The transmitting module 930 may perform the transmitting functions of virtual computing device 900. For example, in a particular embodiment, transmitting module 930 may transmit, to the second network node 160, an acknowledgement indicating successful receipt of the first handover command.

The initiating module 940 may perform the initiating functions of virtual computing device 900. For example, in a particular embodiment, initiating module 940 may initiate a handover to the third network node in response to the first handover command.

The releasing module 950 may perform the discarding functions of virtual computing device 900. For example, in a particular embodiment, releasing module 950 may release the configuration associated with the second network node 160 after expiration of the timer.

Other embodiments of virtual computing device 900 may include additional components beyond those shown in FIG. 16 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 17:
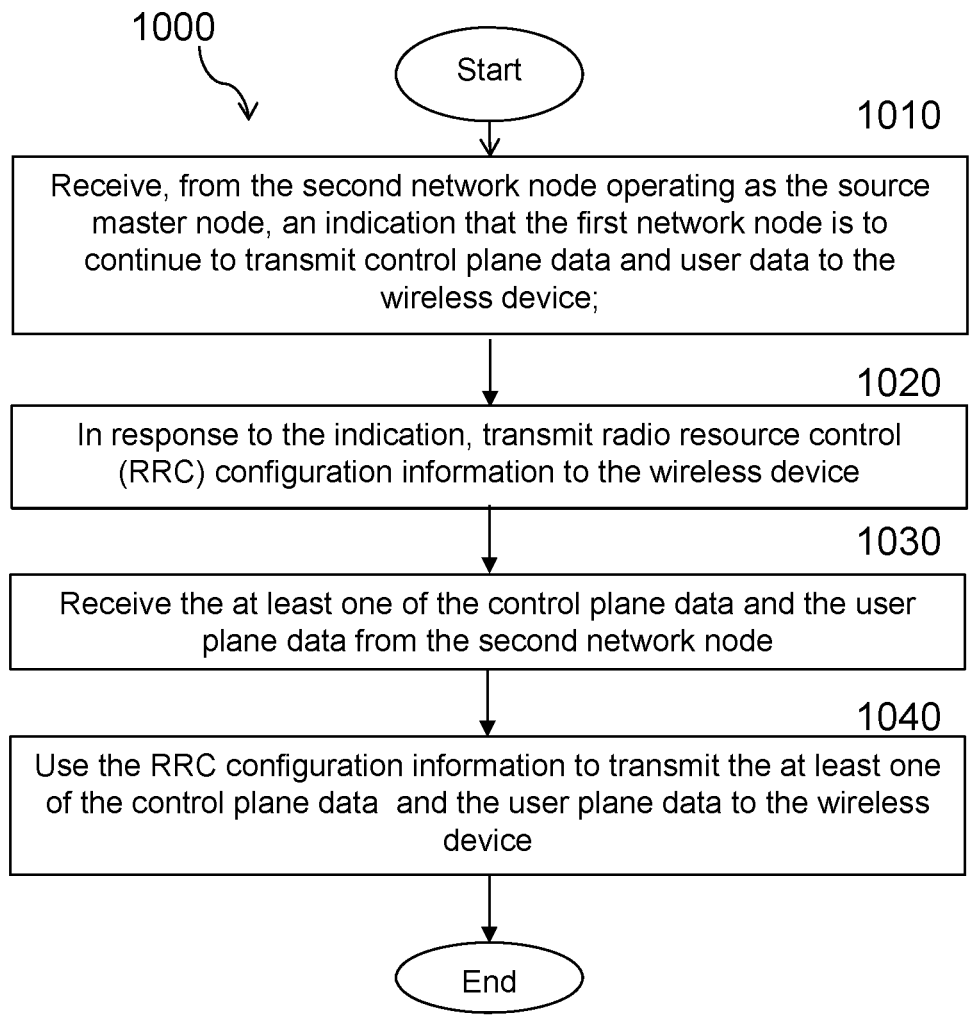
FIG. 17 another example method by a network node for performing handover of a wireless device receiving split SRB, according to certain embodiments.

FIG. 17 another example method by a first network node 160 for performing handover of a wireless device 110 receiving split SRB, according to certain embodiments. The first network node 160 may operate as a secondary node (i.e., SeNB or SgNB) for a wireless device 110 having dual connectivity to the first network node 160 and a second network node 160b operating as a source master node (i.e., MeNB or a MgNB). The method may be performed during a handover from the second network node 160b to a third network node operating as a target master node (i.e., T-MeNB or T-MgNB.

The method begins at step 1010 when the first network node 160 receives, from the second network node 160b operating as the source master node, an indication that the first network node 160 is to continue to transmit control plane data and user data to the wireless device 110.

At step 1020 and in response to the indication, the first network node 160 transmits RRC configuration information to the wireless device 110. In a particular embodiment, the RRC configuration information includes a new C-RNTI. Thereafter, the first network node 160 may receive a random access message from the wireless device 110. The random access procedure message may identify the new C-RNTI, and the first network node 160 may apply the new security key and the C-RNTI in response to receiving the random access message.

Additionally, or alternatively, first network node 160 may determine, in response to receiving the random access message from the wireless device 110 identifying the new C-RNTI, that the handover to the third network node is successful. The first network node 160 may then transmit an indication to the second network node 160b identifying that that the handover to the third network node is successful.

At step 1030, the first network node 160 receives the at least one of the control plane data and the user plane data from the second network node 160b operating as the master network node. The first network node 160 then uses at step 1040 the RRC configuration information to transmit the at least one of the control plane data and the user plane data to the wireless device 110.

According to a particular embodiment, the first network node 160 also receives a security key from the second network node 160b operating as the source master node and uses the security key when transmitting the at least one of the control plane data and the user plane data to the wireless device 110.

Figure 18:
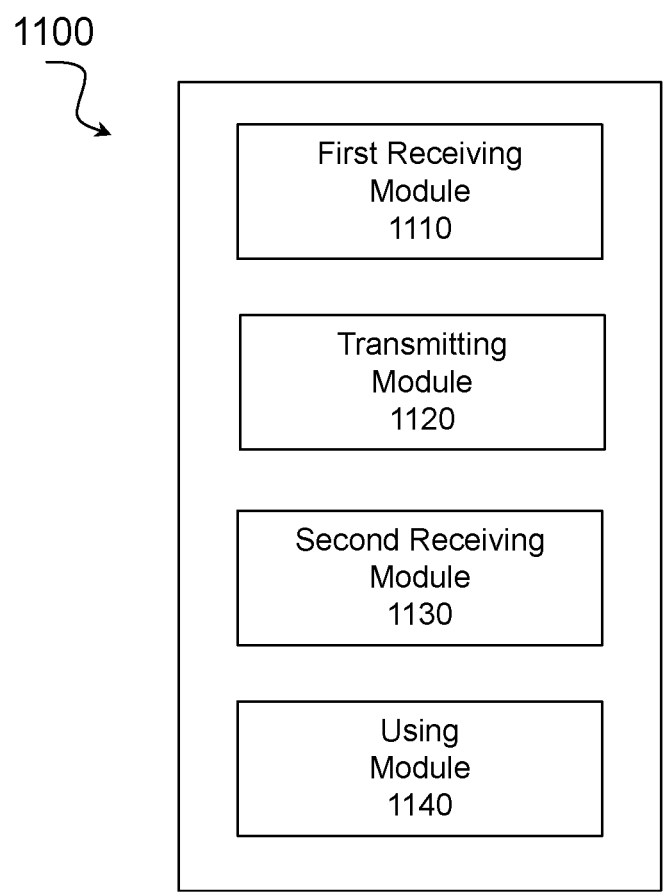
FIG. 18 illustrates another example virtual computing device for performing handover of a wireless device receiving split SRB, according to certain embodiments.

In certain embodiments, the method by a first network node 160 for performing handover of a wireless device 110 receiving split SRB may be performed by a virtual computing device. FIG. 18 illustrates another example virtual computing device 1100 for split SRB handover, according to certain embodiments. In certain embodiments, virtual computing device 1100 may include modules for performing steps similar to those described above with regard to the method illustrated and described in FIG. 17. For example, virtual computing device 1100 may include a first receiving module 1110, a transmitting module 1120, a second receiving module 1130, a using module 1140, and any other suitable modules for performing handover of wireless device 110 receiving split SRB. In some embodiments, one or more of the modules may be implemented using processor 170 of FIG. 8. In certain embodiments, the functions of two or more of the various modules may be combined into a single module.

The first receiving module 1110 may perform certain of the receiving functions of virtual computing device 1100. For example, in a particular embodiment, first receiving module 1110 may receive, from the second network node 160b operating as the source master node, an indication that the first network node 160 is to continue to transmit control plane data and user data to the wireless device 110.

The transmitting module 1120 may perform the transmitting functions of virtual computing device 1100. For example, in a particular embodiment, transmitting module 1120 may transmit RRC configuration information to the wireless device 110.

The second receiving module 1130 may perform certain of the receiving functions of virtual computing device 1100. For example, in a particular embodiment, second receiving module 1130 may receive the at least one of the control plane data and the user plane data from the second network node 160b operating as the master network node.

The using module 1140 may perform the using functions of virtual computing device 1100. For example, in a particular embodiment, using module 1140 may use the RRC configuration information to transmit the at least one of the control plane data and the user plane data to the wireless device 110.

Other embodiments of virtual computing device 900 may include additional components beyond those shown in FIG. 18 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 19:
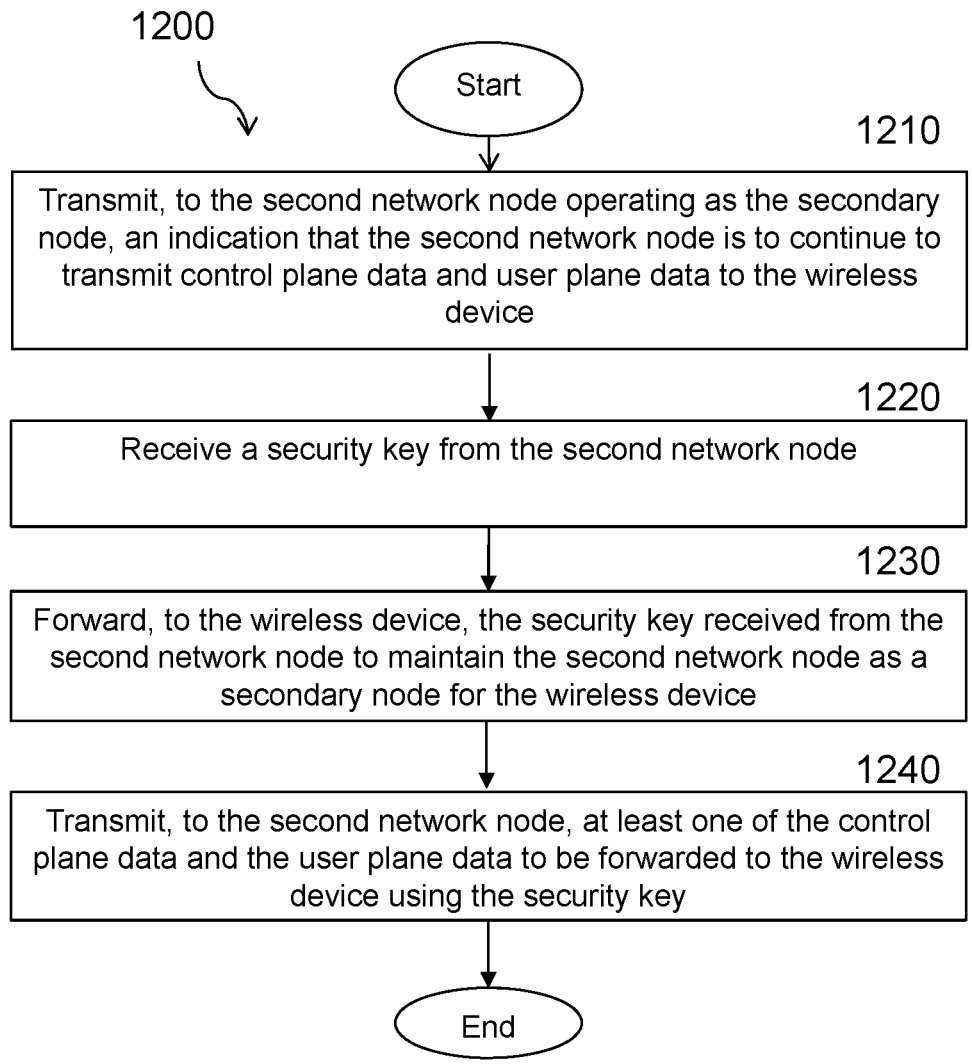
FIG. 19 another example method by a network node for performing handover of a wireless device receiving split SRB, according to certain embodiments.

FIG. 19 another example method by a first network node 160 for performing handover of a wireless device 110 receiving split SRB, according to certain embodiments. The first network node 160 may operate as a master node (i.e., MeNB or a MgNB) for a wireless device 110 having dual connectivity to the first network node 160 and a second network node 160b operating as a secondary node (i.e., SeNB or SgNB). The method may be performed during a handover from the second network node 160b to a third network node operating as a target master node (i.e., T-MeNB or T-MgNB.

At step 1210, the first network node 160 transmits, to the second network node 160b operating as the secondary node, an indication that the second network node 160b is to continue to transmit control plane data and user plane data to the wireless device 110.

At step 1220, the first network node 160 receives a security key from the second network node 160b. To maintain the second network node 160b as a secondary node for the wireless device 110, the first network node 160 forwards the security key received from the second network node 160b to the wireless device 110 at step 1230.

At step 1240, the first network node 160 transmits at least one of the control plane data and the user plane data to the second network node 160b for forwarding to the wireless device 110 using the security key.

According to certain embodiments, the first network node 160 operating as the master network node may periodically transmit handover commands to the wireless device 110 until an indication is received from the second network node 160b which identifies that that the handover to the third network node was successful. After receiving the indication of the successful handover, the first network node 160 may cease transmitting a handover command to the wireless device 110. Additionally, or alternatively, the first network node 160 operating as the master node may delete UE context information associated with the wireless device 110 after receiving the indication that the handover to the third network node was successful.

Figure 20:
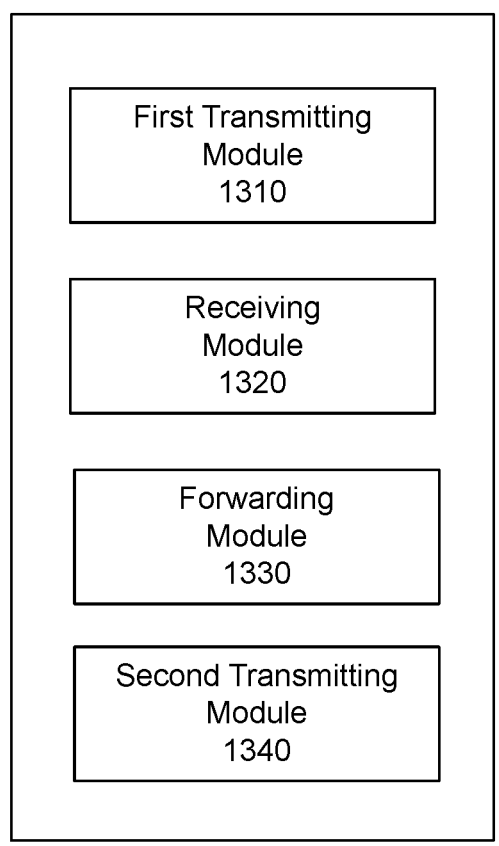
FIG. 20 illustrates another example virtual computing device for performing handover of a wireless device receiving split SRB handover, according to certain embodiments.

In certain embodiments, the method by a first network node 160 performing handover of a wireless device 110 receiving split SRB may be performed by a virtual computing device. FIG. 20 illustrates another example virtual computing device for performing handover of a wireless device 110 receiving split SRB, according to certain embodiments. In certain embodiments, virtual computing device 1300 may include modules for performing steps similar to those described above with regard to the method illustrated and described in FIG. 19. For example, virtual computing device 1300 may include a first transmitting module 1310, a receiving module 1320, a forwarding module 1330, a second transmitting module 1340, and any other suitable modules for performing handover of a wireless device 110 receiving split SRB. In some embodiments, one or more of the modules may be implemented using processor 170 of FIG. 8. In certain embodiments, the functions of two or more of the various modules may be combined into a single module.

The first transmitting module 1310 may perform certain of the transmitting functions of virtual computing device 1300. For example, in a particular embodiment, first transmitting module 1310 may transmits to the second network node 160b operating as the secondary node, an indication that the second network node 160b is to continue to transmit control plane data and user plane data to the wireless device 110.

The receiving module 1320 may perform the receiving functions of virtual computing device 1300. For example, in a particular embodiment, receiving module 1320 may receive a security key from the second network node 160b.

The forwarding module 1330 may perform certain of the forwarding functions of virtual computing device 1300. For example, in a particular embodiment, forwarding module 1330 may forward the security key received from the second network node 160b to the wireless device 110 to maintain the second network node 160b as a secondary node for the wireless device 110.

The second transmitting module 1340 may perform certain of the transmitting functions of virtual computing device 1300. For example, in a particular embodiment, second transmitting module 1340 may transmit at least one of the control plane data and the user plane data to the second network node 160b for forwarding to the wireless device 110 using the security key.

Other embodiments of virtual computing device 1300 may include additional components beyond those shown in FIG. 20 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 21:
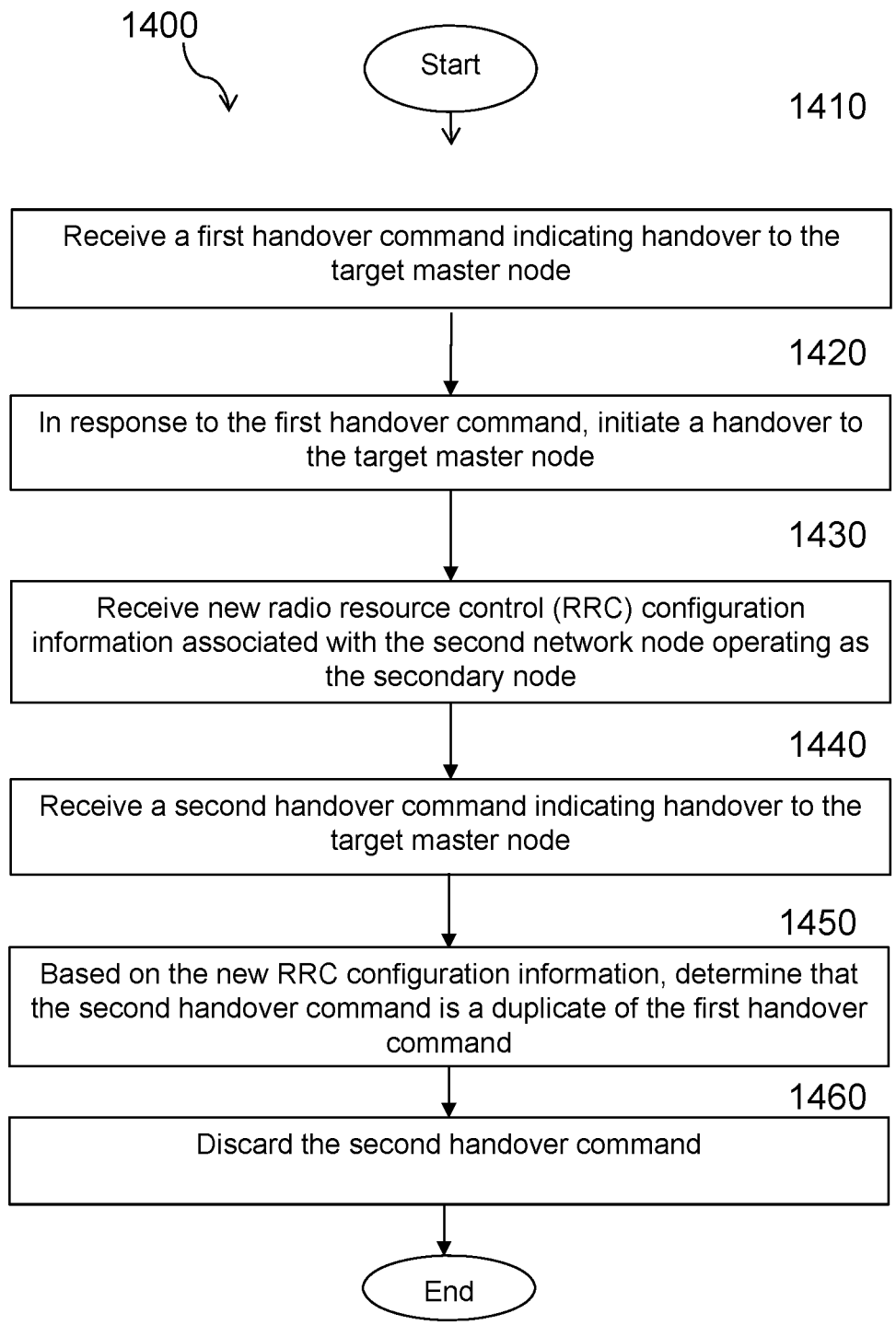
FIG. 21 another example method by a wireless device for receiving split SRB during handover, according to certain embodiments.

FIG. 21 another example method by a wireless device 110 for receiving split SRB, according to certain embodiments. The wireless device 110 may have dual connectivity to a first network node 160 operating as a source master node and a second network node 160b operating as a secondary node, and the method may be performed during a handover from the first network node 160 to a third network node operating as a target master node.

At step 1410, the wireless device 110 receives a first handover command indicating handover to the third network node operating as the target master node. In response to the first handover command, the wireless device 110 initiates a handover to the target master node at step 1420.

At step 1430, the wireless device 110 receives new radio resource control (RRC) configuration information associated with the second network node 160b operating as the secondary node.

At step 1440, the wireless device 110 receives a second handover command indicating handover to the target master node. Based on the new RRC configuration information, the wireless device 110 determines that the second handover command is a duplicate of the first handover command at step 1450 and discards the second handover command at step 1450.

According to a particular embodiment, the wireless device 110 may also receive a security key from the first network node 160 operating as the master node. Based on the new RRC configuration information and the security key, the wireless device 110 may receive at least one of control plane information and user plane information from the second network node 160b operating as the secondary node.

Figure 22:
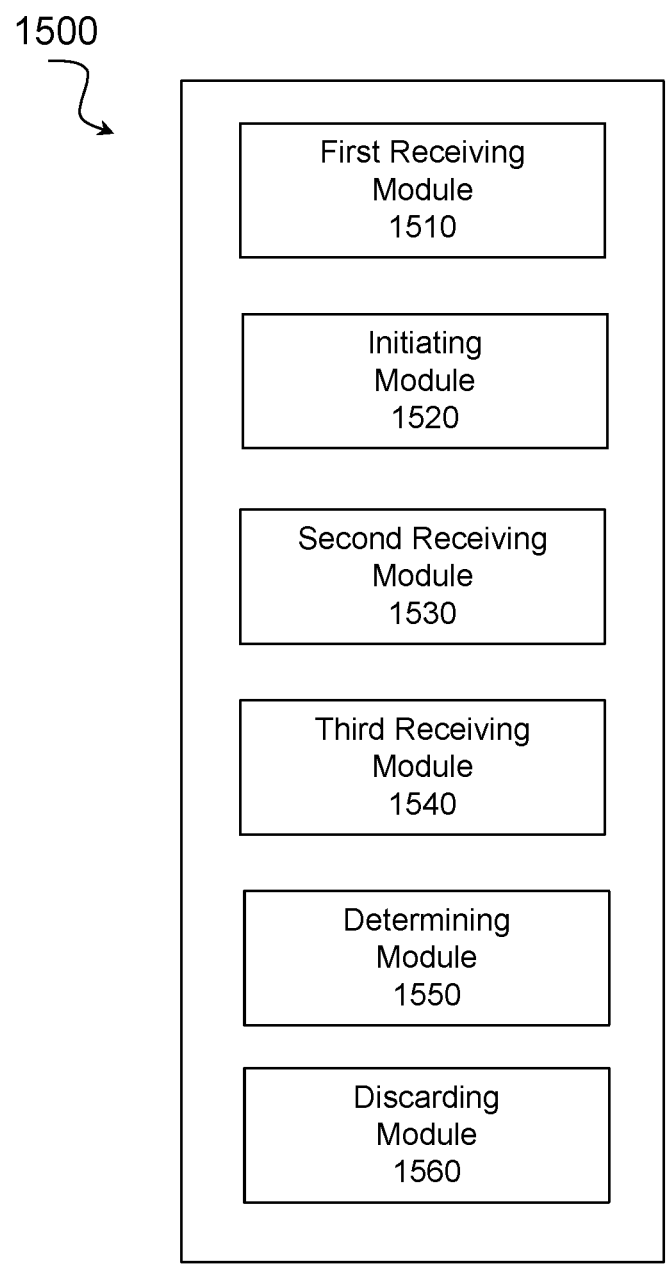
FIG. 22 another example virtual computing device for receiving split SRB during handover, according to certain embodiments.

In certain embodiments, the method for receiving split SRB during handover may be performed by a virtual computing device. FIG. 22 another example virtual computing device 1500 for receiving split SRB during handover, according to certain embodiments. In certain embodiments, virtual computing device 1500 may include modules for performing steps similar to those described above with regard to the method illustrated and described in FIG. 21. For example, virtual computing device 1500 may include a first receiving module 1510, an initiating module 1520, a second receiving module 1530, a third receiving module 1540, a determining module 1550, a discarding module 1560, and any other suitable modules for receiving split SRB during handover. In some embodiments, one or more of the modules may be implemented using processor 201 of FIG. 9. In certain embodiments, the functions of two or more of the various modules may be combined into a single module.

The first receiving module 1510 may perform certain of the receiving functions of virtual computing device 1500. For example, in a particular embodiment, first receiving module 1510 may receive a first handover command indicating handover to the third network node operating as the target master node.

The initiating module 1520 may perform the initiating functions of virtual computing device 1500. For example, in a particular embodiment, initiating module 1520 may initiate a handover to the target master node.

The second receiving module 1530 may perform certain of the receiving functions of virtual computing device 1500. For example, in a particular embodiment, second receiving module 1530 may transmit, to the second network node 160b, an acknowledgement indicating successful receipt of the first handover command.

The third receiving module 1540 may perform certain other of the receiving functions of virtual computing device 1500. For example, in a particular embodiment, third receiving module 1540 may receive new radio resource control (RRC) configuration information associated with the second network node 160b operating as the secondary node 160.

The determining module 1550 may perform the determining functions of virtual computing device 1500. For example, in a particular embodiment, determining module 1550 may determine that the second handover command is a duplicate of the first handover command based on the RRC configuration information.

The discarding module 1560 may perform the discarding functions of virtual computing device 1500. For example, in a particular embodiment, discarding module 1560 may discard the second handover command.

Other embodiments of virtual computing device 900 may include additional components beyond those shown in FIG. 22 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Abbreviations

At least some of the following abbreviations may be used in this disclosure:

1×RTT CDMA2000 1× Radio Transmission Technology
3GPP 3rd Generation Partnership Project
5G 5th Generation
ABS Almost Blank Subframe
AP Application Protocol
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Control Plane
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DC Dual Connectivity
DCCH Dedicated Control Channel
DL Downlink
DM Demodulation
DMRS Demodulation Reference Signal
DRB Data Radio Bearer
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-RAB EUTRAN Radio Access Bearer
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
GTP-U GPRS Tunneling Protocol—User Plane
HARQ Hybrid Automatic Repeat Request
HO Handover
HSPA High Speed Packet Access
HRPD High Rate Packet Data
IP Internet Protocol
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master Cell Group
MDT Minimization of Drive Tests
MeNB Master eNB
MgNB Master gNB
MIB Master Information Block
MME Mobility Management Entity
MN Master Node
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCG Secondary Cell Group
SCH Synchronization Channel
SCTP Stream Control Transmission Protocol
SCell Secondary Cell
SDU Service Data Unit
SeNB Secondary eNB
SgNB Secondary gNB
SFN System Frame Number
SGW Serving Gateway
SI System Information
SIB System Information Block
SN Secondary Node
SNR Signal to Noise Ratio
SON Self Optimized Network
SRB Signaling Radio Bearer
SS Synchronization Signal
SSS Secondary Synchronization Signal
TDD Time Division Duplex
TDOA Time Difference of Arrival
TEID Tunnel Endpoint IDentifier TNL Transport Network Layer
TOA Time of Arrival
TSS Tertiary Synchronization Signal
TTI Transmission Time Interval
UE User Equipment
UDP User Datagram Protocol
UL Uplink
UMTS Universal Mobile Telecommunication System
UP User Plane
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a first network node operating as a secondary node for a wireless device having dual connectivity to the first network node and a second network node operating as a source master node, the method performed during a handover of the wireless device from the second network node operating as the master node to a third network node operating as a target master node, the method comprising:
   receiving, from the second network node operating as the source master node, an indication that the first network node is to release one or more resources for serving user plane data to the wireless device; and
   in response to the indication, transmitting control plane data to the wireless device while ceasing to provide user plane data to the wireless device.

2. The method of claim 1, further comprising:
   in response to receiving the indication, releasing the one or more resources for serving the user plane data to the wireless device while retaining one or more resources for serving the control plane data.

3. The method of claim 1, further comprising:
   receiving, from the second network node operating as the source master node, a data forwarding address associated with the third network node;
   receiving user plane data from the second network node; and
   forwarding the user plane data received from the second network node to the data forwarding address associated with the third network node.

4. The method of claim 1, further comprising:
   receiving, from the second network node operating as the source master node, an indication that the first network node is to stop transmitting control plane data to the wireless device; and
   in response to the indication, ceasing to transmit any pending or new control plane data to the wireless device.

5. The method of claim 1, further comprising:
   receiving, from the third network node operating as the target master node, an indication that the first network node is to stop transmitting control plane data to the wireless device; and
   in response to the indication, ceasing to transmit any pending or new control plane data to the wireless device.

6. The method of claim 1, wherein the control plane data comprises a radio resource control packet data unit (RRC PDU) that includes a handover command, and the method further comprises:
   receiving, from the wireless device, an acknowledgement indicating that the RRC PDU was successfully received by the wireless device; and
   based on the acknowledgement, determining, by the first network node, that the wireless device has been handed over to the third network node and ceasing to transmit any pending or new control plane data to the wireless device.

7. The method of claim 6, further comprising:
   transmitting, to the second network node operating as the source master node, an indication that the RRC PDU was successfully received by the wireless device to prompt the second network node to cease transmitting handover commands to the wireless device or delete a UE context associated with the wireless device.

8. The method of claim 1, wherein the wireless device also has dual connectivity with a fourth network node operating as another secondary node.

9. A first network node operating as a secondary node for a wireless device having dual connectivity to the first network node and a second network node operating as a source master node, the first network node comprising:
   memory storing instructions; and
   processing circuitry operable to execute the instructions to cause the first network node to:
      during a handover of the wireless device from the second network node operating as the master node to a third network node operating as a target master node, receive, from the second network node, an indication that the first network node is to release resources for serving user plane data to the wireless device; and
      in response to the indication, transmit control plane data to the wireless device while ceasing to provide user plane data to the wireless device.

10. The first network node of claim 9, wherein the processing circuitry is further operable to execute the instructions to cause the first network node to:
    in response to receiving the indication, release the one or more resources for serving the user plane data to the wireless device while retaining one or more resources for serving the control plane data.

11. The first network node of claim 9, wherein the processing circuitry is further operable to execute the instructions to cause the first network node to:
    receive, from the second network node operating as the source master node, a data forwarding address associated with the third network node;
    receive user plane data from the second network node; and
    forwarding the user plane data received from the second network node to the data forwarding address associated with the third network node.

12. The first network node of claim 9, wherein the processing circuitry is further operable to execute the instructions to cause the first network node to:
    receive, from the second network node operating as the source master node, an indication that the first network node is to stop transmitting control plane data to the wireless device; and
    in response to the indication, cease to transmit any pending or new control plane data to the wireless device.

13. The first network node of claim 9, wherein the processing circuitry is further operable to execute the instructions to cause the first network node to:

receive, from the third network node operating as the target master node, an indication that the first network node is to stop transmitting control plane data to the wireless device; and in response to the indication, cease to transmit any pending or new control plane data to the wireless device.

14. The first network node of claim 9, wherein the control plane data comprises a radio resource control packet data unit (RRC PDU) that includes a handover command, and the processing circuitry is further operable to execute the instructions to cause the first network node to:

receive, from the wireless device, an acknowledgement indicating that the RRC PDU was successfully received by the wireless device; and based on the acknowledgement, determine, by the first network node, that the wireless device has been handed over to the third network node and cease to transmit any pending or new control plane data to the wireless device.

15. The first network node of claim 14, the processing circuitry is further operable to execute the instructions to cause the first network node to:

transmit, to the second network node operating as the source master node, an indication that the RRC PDU was successfully received by the wireless device to prompt the second network node to cease transmitting handover commands to the wireless device or delete a UE context associated with the wireless device.

16. The method of claim 9, wherein the wireless device also has dual connectivity with a fourth network node operating as another secondary node.

* * * * *